US007416323B2

(12) United States Patent
Okada et al.

(10) Patent No.: US 7,416,323 B2
(45) Date of Patent: Aug. 26, 2008

(54) VEHICLE HEADLAMP

(75) Inventors: Noriko Okada, Shizuoka (JP); Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 237 days.

(21) Appl. No.: 11/375,261

(22) Filed: Mar. 15, 2006

(65) Prior Publication Data

US 2006/0209552 A1 Sep. 21, 2006

(30) Foreign Application Priority Data

Mar. 15, 2005 (JP) .......................... P.2005-072844
Mar. 15, 2005 (JP) .......................... P.2005-072845

(51) Int. Cl.
*B60Q 1/04* (2006.01)

(52) U.S. Cl. ...................................... 362/538; 362/517

(58) Field of Classification Search ................. 362/517, 362/538

See application file for complete search history.

(56) References Cited

U.S. PATENT DOCUMENTS 6,454,448 B2 * 9/2002 Taniuchi et al. ............. 362/517
6,953,272 B2 * 10/2005 Hayakawa et al. .......... 362/517
7,237,934 B2 * 7/2007 Kagiyama ................... 362/538

FOREIGN PATENT DOCUMENTS

JP 2000-348508 A 12/2000
JP 2004-127830 A 4/2004

* cited by examiner

*Primary Examiner*—Sandra O'Shea
*Assistant Examiner*—James W Cranson
(74) *Attorney, Agent, or Firm*—Sughrue Mion, PLLC

(57) ABSTRACT

A distance from a center position of the light source to a rear focal point of a projection lens is smaller than a focal length of the projection lens. The light source is constituted by a line segment light source extended in a vehicle width direction. An opening portion is formed at a rear portion of a first reflector. A second reflector reflects light directed to a rear side from the light source to a front side to be proximate to an optical axis.

13 Claims, 20 Drawing Sheets

VEHICLE HEADLAMP

The present application claims foreign priority based on Japanese Patent Applications No. P.2005-072844, filed on Mar. 15, 2005 and P.2005-072845, filed on Mar. 15, 2005, the contents of them are incorporated herein by reference.

BACKGROUND OF THE INVENTION

1. Field of the Invention

The present invention relates to a vehicle headlamp which is so-called a projector type headlamp.

2. Related Art

Generally, a vehicle headlamp of a projector type is constituted such that a projection lens is arranged on an optical axis extended in a longitudinal direction of a vehicle, a light source is arranged on a side rearward from a rear focal point thereof, and light from the light source is reflected to be proximate to the optical axis by a reflector.

Disclosed in JP-A-2004-127830 is a vehicle headlamp of a projector type in which a light source thereof is constituted as a line segment light source extended in a vehicle width direction.

Further, disclosed in JP-A-2000-348508 is a vehicle headlamp of a projector type including a mirror member having an upward directed reflecting face extended from a vicinity of a rear focal point of a projection lens to a rear side such that a portion of reflected light from a reflector thereof is reflected to an upper side.

When the vehicle headlamp constituting the light source by the line segment light source extended in the vehicle width direction is adopted as described in JP-A-2004-127830, an inverted projected image of the light source formed by the projection lens can be constituted by an image substantially in a transversely prolonged rectangular shape extended to be long in a horizontal direction and therefore, a transversely prolonged light distribution pattern having a small nonuniformity in light distribution can easily be formed. Further, when constituted in this way, there can easily be constructed a constitution in which a light source bulb is inserted to be fixed by the reflector from a side direction of the optical axis, thereby, a front and rear length of a lamp piece can be shortened to achieve thin-sized formation thereof.

Further, when the vehicle headlamp including the mirror member as described in JP-A-2000-348508 is adopted, a light distribution pattern having a clear cut off line as an inverted projected image of a front end edge of the upward directed reflecting face at an upper end portion thereof can be formed and reflected from the reflector can effectively be utilized as a front irradiating light.

However, according to the vehicle headlamps described in JP-A-2004-127830 and JP-A-2000-348508, a solid angle of a reflecting face of the reflector relative to the light source cannot be increased so much and therefore, a problem that there is a limit in increasing an efficiency of utilizing a light flux of the light source is posed.

SUMMARY OF THE INVENTION

One or more embodiments of the present invention provide a vehicle headlamp achieving thin formation of a lamp piece, capable of forming a transversely prolonged light distribution pattern having a small nonuniformity in light distribution and capable of increasing an efficiency of utilizing a light flux of a light source.

In accordance with one or more embodiments of the present invention, a vehicle headlamp is provided with: a projection lens arranged on an optical axis extended in a longitudinal direction of a vehicle; a light source arranged on a rear side of a rear focal point of the projection lens, wherein the light source is constituted as a line segment light source extended in a vehicle width direction and a distance from a center position of the light source to the rear focal point of the projection lens is smaller than a focal length of the projection lens; a first reflector that reflects light from the light source to direct in a front direction to be proximate to the optical axis; an opening portion formed on a region of a rear portion of the first reflector proximate to the optical axis; and a second reflector provided on a rear side of the first reflector, wherein the light directed to a rear side from the light source is reflected on the second reflector to a front side to be proximate to the optical axis.

A specific constitution of the above-described "light source" is not particularly limited so far as the light source is constituted as the line segment light source extended in the vehicle width direction but, for example, a discharge light emitting portion of a discharge bulb, a filament of a halogen bulb, or a plurality of light emitting chips in a light emitting diode having the plurality of light emitting chips arranged in a row-like shape or the like can be adopted. Further, a specific arrangement of the "light source" is not particularly limited so far as the light source is arranged to a position at which the distance from the center position to the rear focal point of the projection lens becomes the value smaller than the focal length of the projection lens, the light source may be arranged on the optical axis or may be arranged at a position deviated from the optical axis.

Specific shapes of reflecting faces of the "first reflector" and the "second reflector" are not particularly limited so far as the reflectors are constituted such that the light from the light source is reflected to the front side to be proximate to the optical axis but, for example, a reflecting face in a shape of an ellipsoid of revolution constituting a first focal point by a center position of the light source and constituting a second focal point by a point at a vicinity of the rear focal point of the projection lens, or a reflecting face in a shape of an enveloping surface of an ellipse which constitutes a first focal point by the center position of the light source and in which a position of a second focal point thereof is changed by a position of a section thereof or the like can be adopted.

As shown by the above-described constitution, according to the one or more embodiments of the present invention, the vehicle headlamp is constituted as the vehicle headlamp of a projector type, the light source is constituted as the line segment light source extended in the vehicle width direction and arranged at the position at which the distance from the center position to the rear focal point of the projection lens becomes the value smaller than the focal length of the projection lens, a region of the rear portion of the first reflector proximate to the optical axis is formed by the opening portion, the rear side of the first reflector is provided with the second reflector for reflecting the light directed to the rear side from the light source by way of the opening portion to the front side to be proximate to the optical axis and therefore, the following operation and effect can be achieved.

That is, the light source is constituted as the line segment light source extended in the vehicle width direction and therefore, an inverted projected image of the light source formed by the projection lens can be made to constitute an image substantially in a transversely prolonged rectangular shape extended to be long in a horizontal direction, thereby, a transversely prolonged light distribution pattern having a small nonuniformity in light distribution can easily be formed.

Further, the distance from the center position of the light source to the rear focal point of the projection lens is set to the value smaller than the focal length of the projection lens and therefore, a solid angle of the reflecting face relative to the light source can be increased by downsizing the first reflector, thereby, much of light emitted from the light source can be made to be incident on the reflecting face of the first reflector.

However, when the reflector is downsized in this way, the inverted projected image of the light source formed by the projection lens is enlarged, however, the light source is constituted by the line segment light source extended in the vehicle width direction, the inverted projected image is enlarged while staying in the image substantially in the transversely prolonged rectangular shape and therefore, the transversely prolonged light distribution pattern can be maintained.

Further, although when the first reflector is downsized in this way, the rear portion is liable to interfere with the light source bulb or the like, the region of the rear portion of the first reflector proximate to the optical axis is formed as the opening portion and therefore, such an interference can be prevented from being brought about beforehand. Further, the rear side of the first reflector is provided with the second reflector for reflecting the light from the light source directed to the rear side by way of the opening portion to the front side to be proximate to the optical axis and therefore, by forming the opening portion, much of light from the light source which cannot be made to be incident on the reflecting face of the first reflector can be made to be incident on the second reflecting face of the second reflector, thereby, the light flux of the light source can effectively be utilized. Further, reflected light from the second reflector is irradiated to the front side by transmitting through the projection lens as light directed to the front side to be proximate to the optical axis and therefore, an inversion projecting control by the projection lens can be carried out.

In this way, in the vehicle headlamp of the projector type, an efficiency of utilizing the light flux of the light source can be increased after achieving thin formation of the lamp piece and enabling to form the transversely prolonged light distribution pattern having a small nonuniformity in light distribution.

In the above-described constitution, although the specific constitution of the light source is not particularly limited as described above, the light source may be constituted by a light emitting portion of a light source bulb inserted from a side direction of the optical axis, in accordance with one or more embodiments of the present invention. In the structure, thin formation of the lamp piece can easily be realized. Further, in the structure, the light source bulb having the line segment light source extended in a direction of the bulb center axis can be used and therefore, a width of selecting a kind of the light source bulb can be widened. Further, in the structure, a member constituting an object of inserting and fixing the light source bulb is not particularly limited but, for example, the first reflector, the second reflector and a member supporting the first reflector and the second reflector can be adopted.

Further, in accordance with one or more embodiments of the present invention, a surrounding of the second reflector may be provided with a third reflector for reflecting the light from the light source to be directed to the front side without transmitting through the projection lens. In the structure, with regard to light which cannot be made to be incident on the reflecting face of the second reflector in light from the light source directed to the rear side by way of the opening portion formed at the region of the rear portion of the first reflector at a vicinity of the optical axis, much of the light can be made to be incident on a reflecting face of the third reflector, thereby, an efficiency of utilizing the light flux of the light source can further be increased.

Further, in accordance with one or more embodiments of the present invention, a mirror member including an upward directed reflecting face extended from a vicinity of the rear focal point to a rear side may be provided between the light source and the projection lens such that portions of reflected light from the first and the second reflectors are reflected to an upper side. In the structure, the following operation and effect can be achieved.

That is, light made to be incident on the upward directed reflecting face of the mirror member in reflected light from the first and the second reflector is reflected to the upper side and therefore, a light distribution pattern having a clear cut off line as an inverted projected image of a front end edge of the upward directed reflecting face at an upper end portion thereof can be formed and the reflected light from the first and the second reflectors can effectively be utilized as frontward irradiated light.

At this occasion, when a constitution in which a skewed lower side on a rear side of the light source is provided with a fourth reflector having a reflecting face substantially in a spherical shape centering on the center position of the light source, is constructed, light directed to the skewed lower side on the rear side from the light source can be reflected by the fourth reflector to be returned to a vicinity of the light source and the light can be made to be incident on the first reflector as diverging light from the vicinity of the light source and therefore, the efficiency of utilizing the light flux of the light source can further be increased.

Similarly, when a constitution in which a skewed lower side on a front side of the light source is provided with a fifth reflector having a reflecting face substantially in a spherical shape centering on the center position of the light source is constructed, light directed to the skewed lower side on the front side from the light source can be reflected by the fifth reflector to return to a vicinity of the light source, the light can be made to be incident on the second reflector as diverging light from the vicinity of the light source and therefore, the efficiency of utilizing the light flux of the light source can further be increased.

In addition, in accordance with one or more embodiments of the present invention, a vehicle headlamp is provided with: a projection lens arranged on an optical axis extended in a longitudinal direction of a vehicle; a light source arranged on a rear side of a rear focal point of the projection lens, wherein the light source is constituted as a line segment light source extended in a vehicle width direction and a distance from a center position of the light source to the rear focal point of the projection lens is smaller than a focal length of the projection lens; a first reflector that reflects light from the light source to direct to a front side to be proximate to the optical axis; a mirror member having an upward directed reflecting face extended to a rear side from a vicinity of the rear focal point, wherein a portion of reflected light from the first reflector is reflected to an upper side; an opening portion formed on a region of a rear portion of the first reflector proximate to the optical axis; a second reflector provided in a rear side of the first reflector and including a reflecting face substantially in a shape of an ellipsoid of revolution, wherein the ellipsoid of revolution has a first focal point by the center position of the light source and a second focal point by a point disposed on a lower side of the first focal point; and a third reflector provided in a lower side of the second reflector, wherein the light reflected on the second reflector is reflected on the third reflector to the front side without transmitting through the projection lens.

A specific constitution of the "light source" is not particularly limited so far as the light source is constituted as the line segment light source extended in the vehicle width direction, for example, a discharge light emitting portion of a discharge bulb, a filament of a halogen bulb, or a plurality of light emitting chips in a light emitting diode having the plurality of light emitting chips arranged in a row-like shape or the like can be adopted. Further, a specific arrangement of the "lights source" is not particularly limited so far as the light source is arranged at a position at which the distance from the center position to the rear focal point of the projection lens becomes the value smaller than the focal length of the projection lens, the light source maybe arranged on the optical axis or may be arranged at a position deviated from the optical axis.

A specific shape of a reflecting face of the "first reflector" is not particularly limited so far as the reflecting face is constituted to reflect light from the light source to be directed to the front side to be proximate to the optical axis, for example, a reflecting face in a shape of an ellipsoid of revolution constituting a first focal point by the center position of the light source and constituting a second focal point by a point at a vicinity of the rear focal point of the projection lens, or a reflecting face in a shape of an enveloping face of an ellipse which constitutes the first focal point by a center position of the light source and a position of the second focal point of which is changed by a position of a section can be adopted.

A specific shape of the reflecting face of the "second reflector" is not particularly limited so far as the second reflector is provided on the rear side of the first reflector and the reflecting face is provided with the reflecting face substantially in the shape of the ellipsoid of revolution constituting the first focal point by the center position of the light source and constituting the second focal point by the point disposed on the lower side of the first focal point.

A specific shape of a reflecting face of the "third reflector" is not particularly limited so far as the third reflector is constituted such that light from the light source reflected by the second reflector is reflected to direct to the front side without transmitting through the projection lens on the rear side of the second reflector.

As shown by the above-described constitution, the vehicle headlamp is constituted as the vehicle headlamp of the projector type including the mirror member, the light source is constituted as the line segment light source extended in the vehicle width direction and arranged at the position at which the distance from the center position to the rear focal point of the projection lens becomes the value smaller than the focal length of the projection lens, further, the region of the rear portion of the first reflector proximate to the optical axis is formed as the opening portion, the rear side of the first reflector is provided with the second reflector having the reflecting face substantially in the shape of the ellipsoid of revolution constituting the first focal point by the center position of the light source and constituting the second focal point by the point disposed on the lower side of the first focal point, further, the lower side of the second reflector is provided with the third reflector for reflecting light from the light source reflected by the second reflector to the front side without transmitting through the projection lens and therefore, the following operation and effect can be achieved.

That is, a portion of reflected light from the first reflector is reflected to the upper side by the mirror member having the upward directed reflecting face extended to the rear side from the vicinity of the rear focal point of the projection lens and therefore, a light distribution having a clear cut off line at an upper end portion thereof can be formed as an inverted projected image of a front end edge of the upward directed reflecting face and reflected light from the first reflector can effectively be utilized as front irradiating light.

At that occasion, the light source is constituted as the line segment light source extended in the vehicle width direction and therefore, the inverted projected image of the light source formed by the projection lens can be made to constitute an image substantially in a transversely prolonged rectangular shape extended to be long in a horizontal direction, thereby, a transversely prolonged light distribution pattern having a small nonuniformity in light distribution can easily be formed.

Further, the distance from the center position of the light source to the rear focal point of the projection lens is set to the value smaller than the focal length of the projection lens and therefore, a solid angle of the reflecting face relative to the light source can be increased by downsizing the first reflector, thereby, much of light emitted from the light source can be made to be incident on the reflecting face of the first reflector.

However, although when the first reflector is downsized in this way, the inverted projected image of the light source formed by the projection lens is enlarged, the light source is the line segment light source extended in the vehicle width direction, the inverted projected image is enlarged while staying in an image substantially in the transversely prolonged rectangular shape and therefore, the transversely prolonged distribution pattern can be maintained.

Further, although when the first reflector is downsized in this way, the rear portion is liable to interfere with a light source bulb or the like, a region of the rear portion of the first reflector proximate to the optical axis is formed as the opening portion and therefore, such an interference can be prevented from being brought about beforehand. Further, the rear side of the first reflector is provided with the second reflector having the reflecting face substantially in the shape of the ellipsoid of revolution constituting the first focal point by the center position of the light source and constituting the second focal point by the point disposed on the lower side of the first focal point, further, the lower side of the second reflector is provided with the third reflector for reflecting reflected light from the second reflector to the front side without transmitting through the projection lens and therefore, light directed to the rear side from the light source by way of the opening portion can be reflected by the second reflector to be temporarily converged to the second focal point, thereafter, made to be incident on the third reflector as diverging light from the second focal point and the light can effectively be utilized as front irradiating light.

In this way, according to the invention, an efficiency of utilizing a light flux of the light source can be increased after achieving thin formation of the lamp piece and enabling to form the transversely prolonged light distribution pattern having a small nonuniformity of light distribution in the vehicle headlamp of the projector type including the mirror member.

Although in the above-described constitution, the specific constitution of the light source is not particularly limited as described above, when the light source is constituted by a light emitting portion of the light source bulb inserted to be fixed from a side direction of the optical axis, thin formation of the lamp piece can easily be realized. Further, when constituted in this way, the light source bulb having the line segment light source extended in the bulb center axis direction can be used and therefore, a width of selecting a kind of the light source bulb can be widened. Further, in this case, a member constituting an object of inserting and fixing the light source bulb is not particularly limited but, for example, the first reflector, the second reflector or the member supporting these can be adopted.

In the above-described constitution, when there is constructed a constitution in which a light shielding plate having a rear end edge extended in the vehicle width direction to pass the second focal point of the second reflector between the second reflector and the third reflector, a portion of reflected light from the second reflector can be shielded by the light shielding plate, thereby, even a light distribution pattern formed by reflected light from the third reflector can include a clear cut off line at an upper end portion thereof.

In that case, when there is constructed a constitution in which the third reflector is provided with a reflecting face in a shape of a parabola column face constituting a focal line by the rear end edge of the light shielding plate, the light distribution formed by reflected light from the third reflector can be made to constitute a transversely prolonged light distribution pattern diverged considerably in a left and right direction.

In the above-described constitution, when there is constructed a constitution in which a skewed lower side on a rear side of the light source is provided with a fourth reflector having a reflecting face substantially in a spherical shape centering on the center position of the light source, light directed to the skewed lower side on the rear side from the light source can be reflected by the fourth reflector to return to a vicinity of the light source, the light can be made to be incident on the first reflector as diverging light from the vicinity of the light source and therefore, the efficiency of utilizing the light flux of the light source can further be promoted.

Similarly, when there is constructed a constitution in which a skewed lower side on a front side of the light source is provided with a fifth reflector having a reflecting face substantially in a spherical shape centering on the center position of the light source, a portion of light directed to the skewed lower side on the front side from the light source can be reflected by the fifth reflector to return to a vicinity of the light source, the light can be made to be incident on the second reflector as diverging light from the vicinity of the light source, thereby, the efficiency of utilizing the light flux of the light source can further be increased.

Or, instead thereof, light from the light source reflected by the sixth reflector can be made to be incident on the third reflector by constructing a constitution in which the skewed lower side on the front side of the light source is provided with a sixth reflector having a reflecting face substantially in the shape of an ellipsoid of revolution constituting a first focal point by the center position of the light source and constituting a second focal point by the second focal point of the second reflector, and even constituted in this way, the efficiency of utilizing the light flux of the light source can further be increased.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
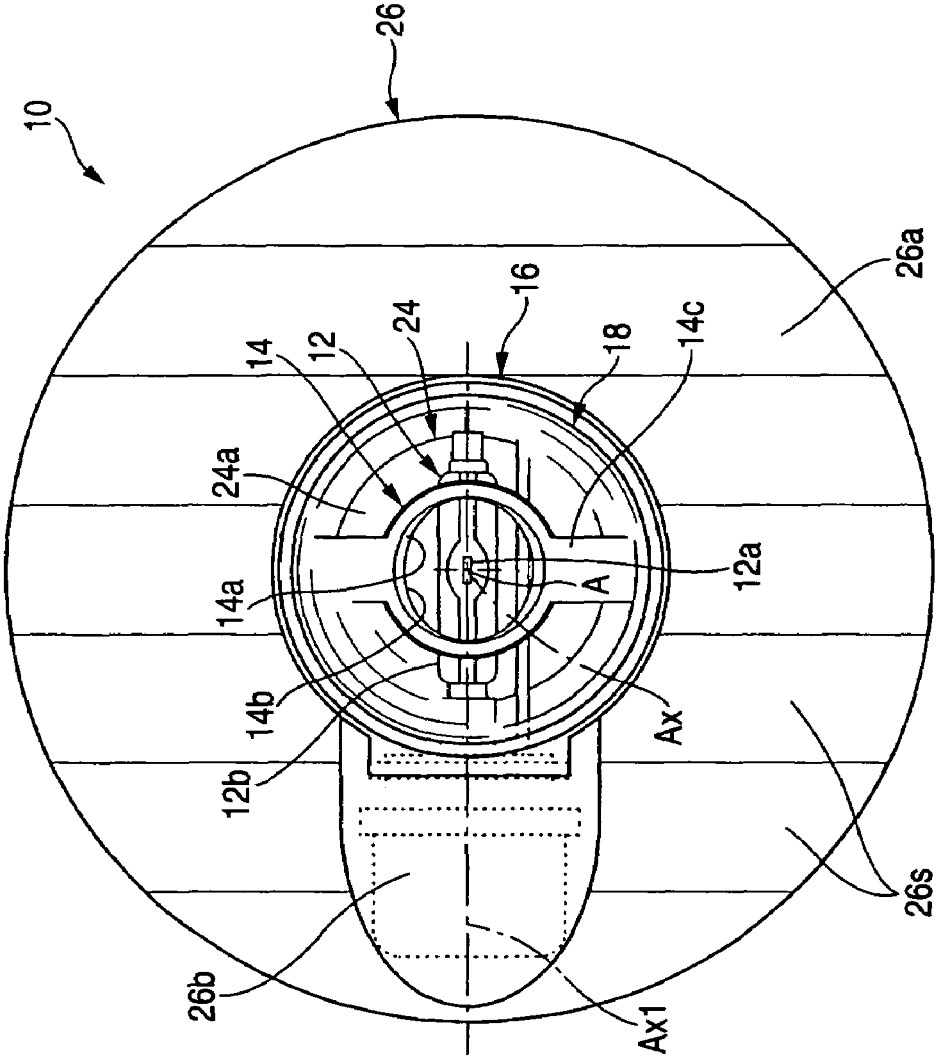
FIG. 1 is a front view showing a vehicle headlamp according to a first exemplary embodiment of the invention.
Figure 2:
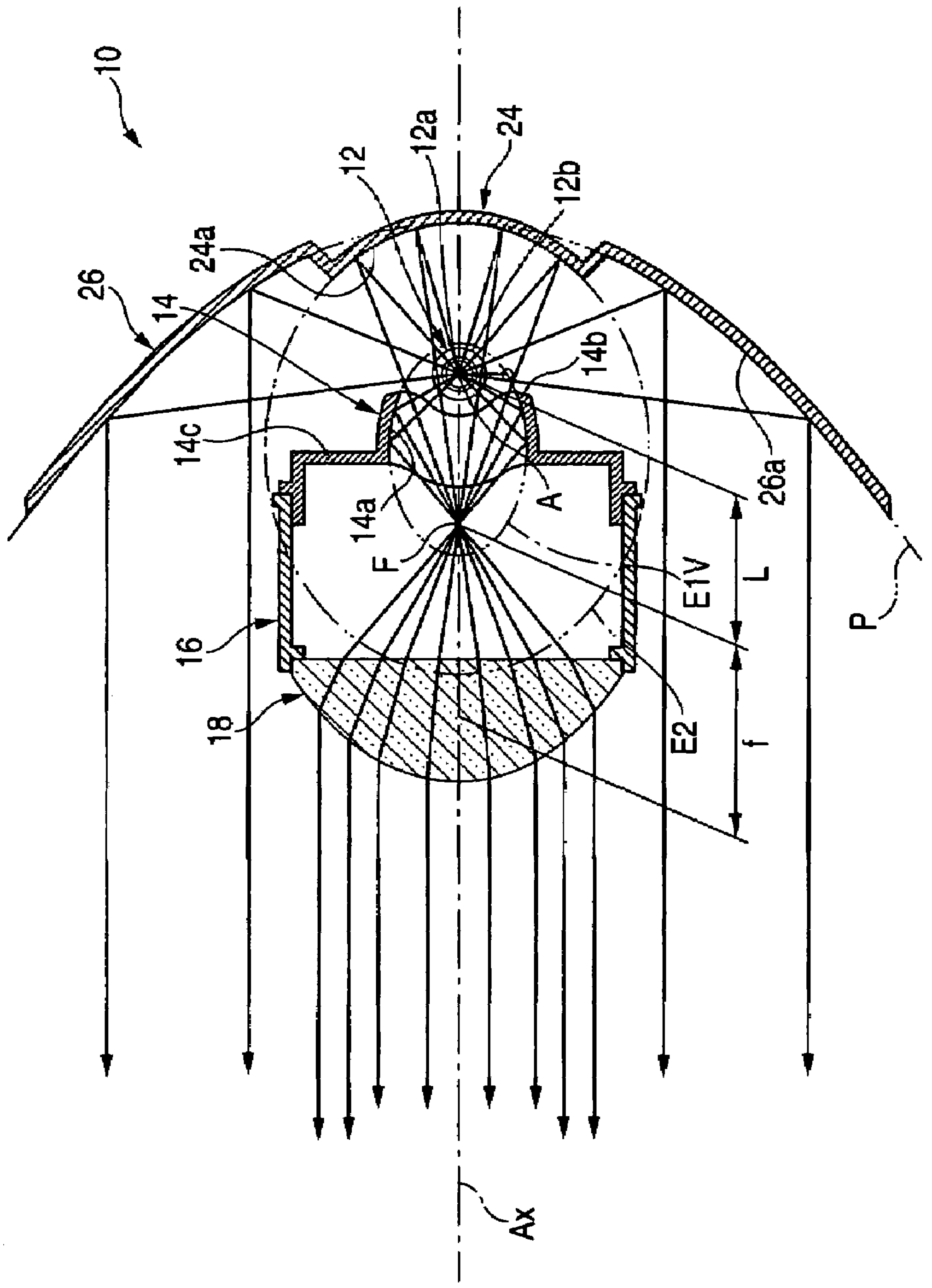
FIG. 2 is a side sectional view showing the vehicle headlamp.
Figure 3:
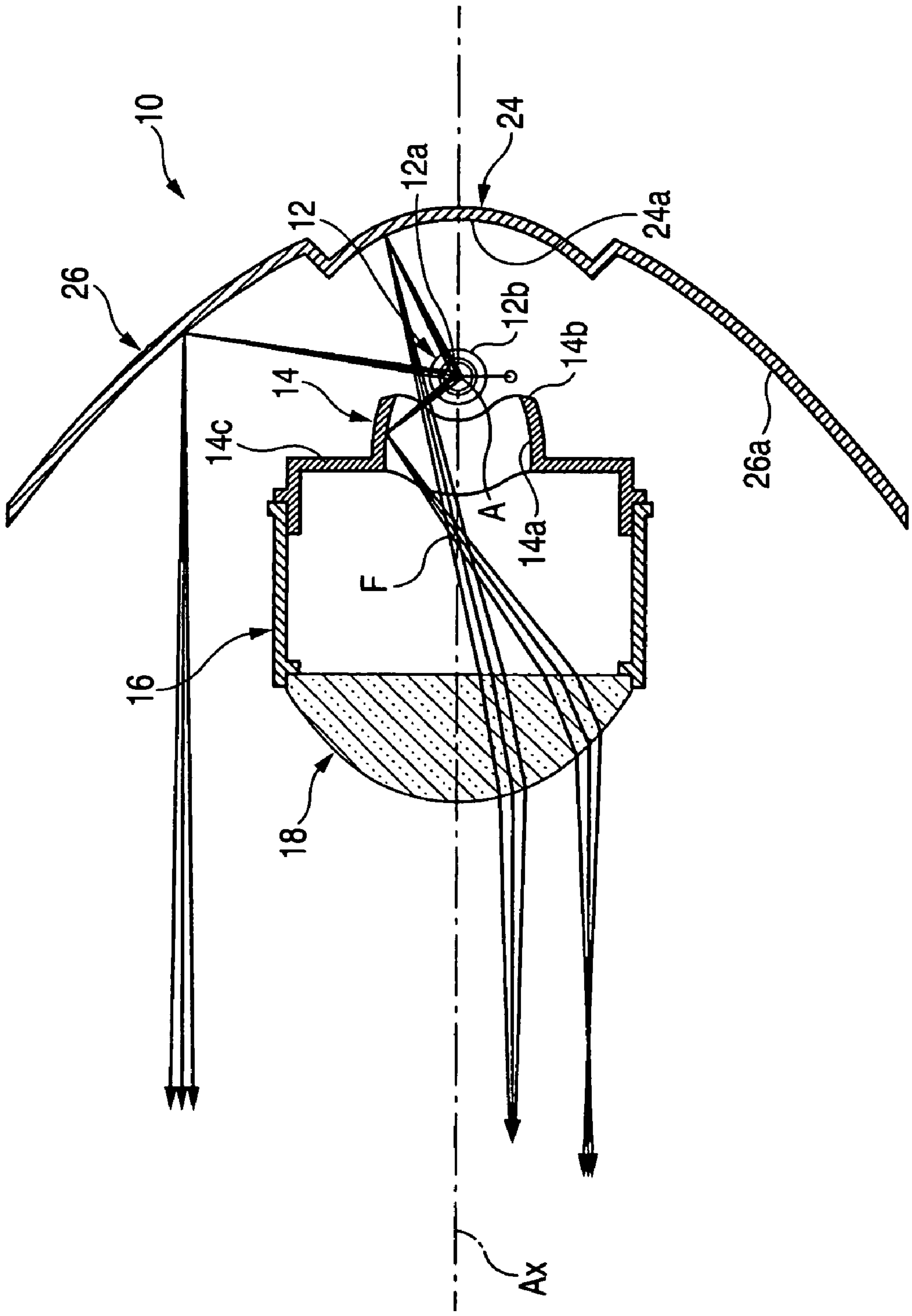
FIG. 3 is a side sectional view showing the vehicle headlamp by attracting attention to an optical path of light emitted from respective portions of a light source thereof.
Figure 4:
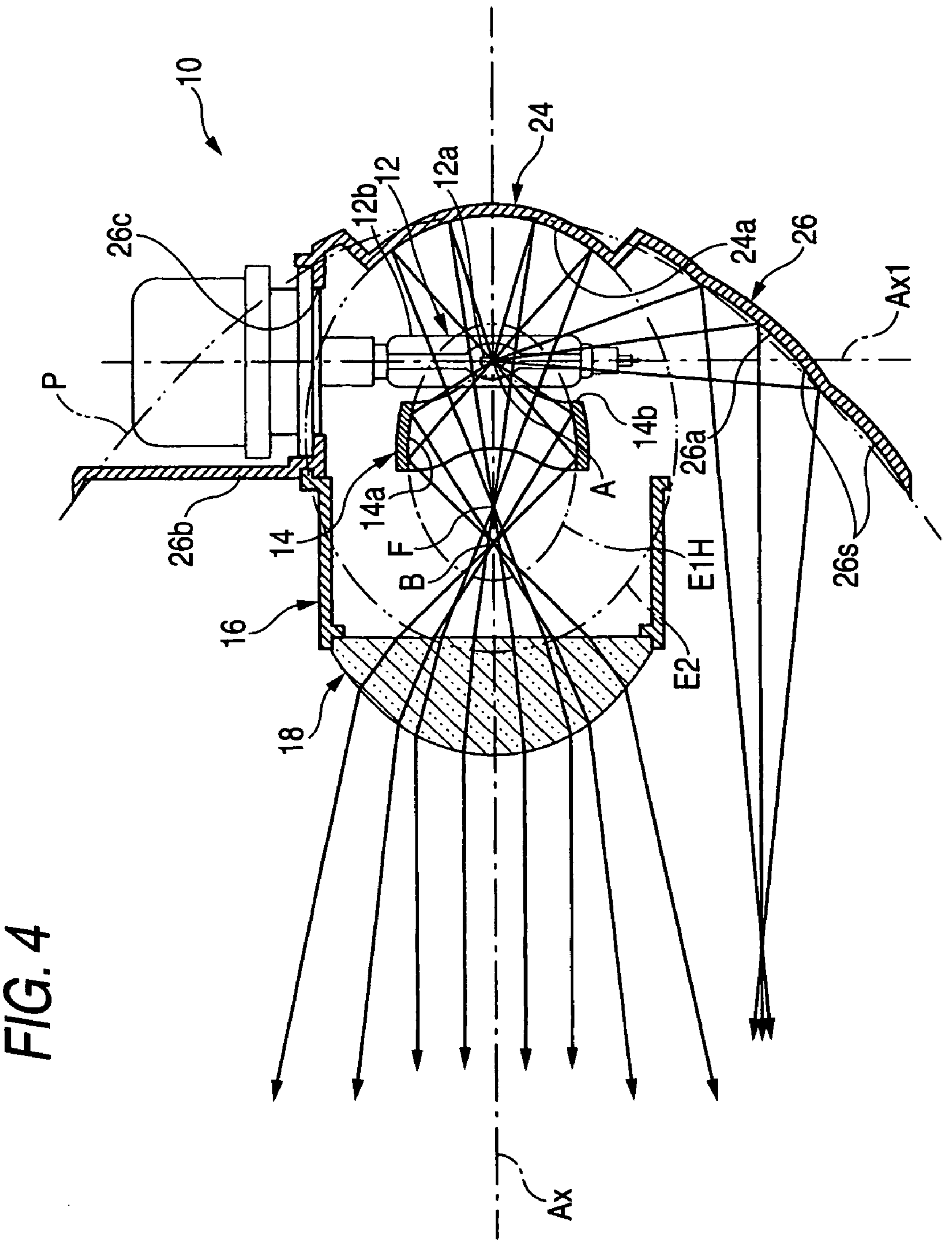
FIG. 4 is a horizontal sectional view showing the vehicle headlamp.
Figure 5:
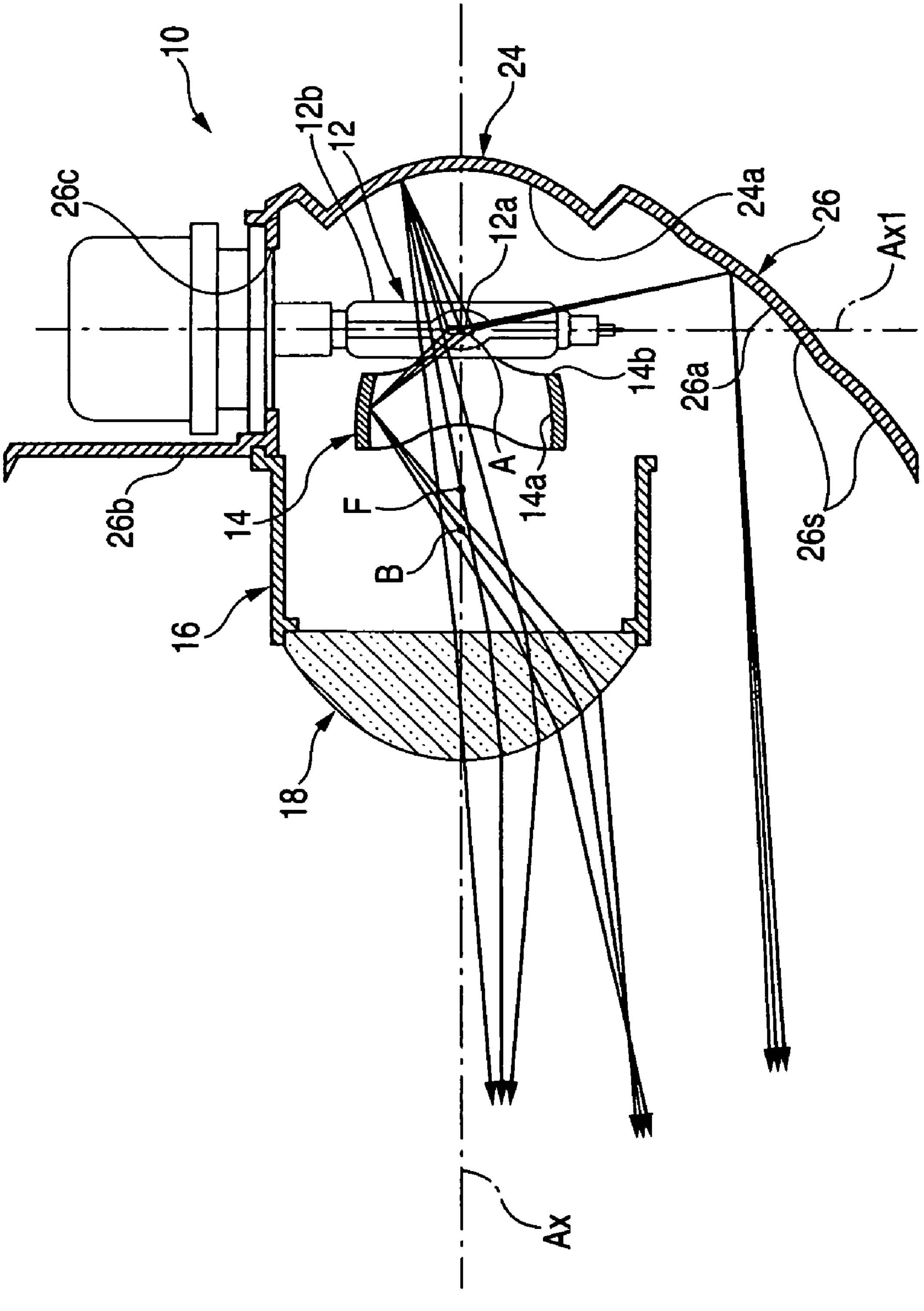
FIG. 5 is a horizontal sectional view showing the vehicle headlamp by attracting attention to the optical path of light emitted from the respective portions of the light source.

FIG. 1 is a plane view showing a vehicle headlamp according to a first exemplary embodiment. FIGS. 2 and 3 are side sectional view thereof and FIGS. 4 and 5 are horizontal sectional views thereof.

As shown by the drawings, a vehicle headlamp 10 according to the embodiment is constituted as a lamp piece unit of a projector type for irradiating light for forming a light distribution pattern for a high beam and is used in a state of being integrated to a lamp body or the like, not illustrated.

The vehicle headlamp 10 is constituted by including a light source bulb 12, a first reflector 14, a second reflector 24, a third reflector 26, a holder 16, and a projection lens 18, and includes an optical axis Ax extended in a longitudinal direction of a vehicle.

The projection lens 18 comprises a flat convex aspherical lens having a front side surface in a convex face and a rear side surface in a flat face and is arranged on the optical axis Ax. Further, the projection lens 18 projects an image on a focal face including a rear focal point F on a vertical imaginary screen arranged on a front side of the lamp piece as an inverted image.

The light source bulb 12 is a discharge bulb of a metal halide bulb or the like constituting a discharging light emitting portion by a light source 12*a* and the light source 12*a* is constituted as a line segment light source extended along a bulb center axis Ax1.

Further, the light source bulb 12 is inserted to and fixed by the third reflector 12 from a right side direction on a side rearward from the rear focal point F of the projection lens 18. The light source bulb 12 is inserted to be fixed thereby such that a center position (that is, a center portion between discharging electrodes on the bulb center axis Ax1) A is positioned on the optical axis Ax in a state of setting the bulb center axis Ax1 to extend in a horizontal direction in a vertical face orthogonal to the optical axis Ax (that is, in a state of being set to extend in a vehicle width direction).

At that occasion, a potion of the light source bulb 12 is set to a position at which a distance L from the center position A of the light source 12*a* to the rear focal point F of the projection lens 18 becomes a value smaller than a focal length f of the projection lens 18 (for example, a position constituting a value of about L=0.4f through 0.8f).

The first reflector 14 is a small-sized reflector arranged to surround the optical axis Ax substantially in a cylindrical shape at a vicinity of a front side of the light source 12*a* and includes a reflecting face 14*a* for reflecting light from the light source 12*a* to a front side to be proximate to the optical axis Ax. The reflecting face 14*a* is set by an elliptical shape in a sectional shape thereof including the optical axis Ax and an eccentricity thereof is set to gradually increase from a vertical section to a horizontal section thereof. That is, as shown by FIG. 2, an ellipse E1V constituting the vertical section including the optical axis Ax constitutes a first focal point by thecenter position A of the light source 12*a* and constitutes a second focal point by the rear focal point F of the projection lens 18, as shown by FIG. 4, an ellipse E1H constituting the horizontal section including the optical axis Ax constitutes a first focal point by the center position A of the light source 12*a* and constitutes a second focal point by a point B disposed slightly forward from the rear focal point F of the projection lens 18. Further, thereby, light emitted from the projection lens 18 is constituted not to be diverged in an up and down direction but diverged considerably in a left and right direction.

A front end edge of the first reflector 14 is formed such that portions disposed on two left and right sides of the optical axis Ax are expanded more to a front side than portions disposed on two up and down sides thereof, thereby, light from the light source 12*a* is made to be incident on the projection lens as much as possible.

A region at a vicinity of the optical axis Ax at a rear portion of the first reflector 14 is formed as an opening portion 14*b*. The opening portion 14*b* is formed to surround a shroud tube 12*b* of the light source bulb 12*b* of the light source bulb 12 at a predetermined interval therefrom, thereby, after avoiding interference with the shroud tube 12*b*, light from the light source 12*a* is made to be incident on the reflecting face 14*a* of the first reflector 14 as much as possible.

The front end edge portion of the first reflector 14 is formed with a pair of upper and lower brackets 14*c* for positioning to fix the first reflector 14 at the holder 16.

The holder 16 is a member formed to extend in a cylindrical shape from a position at a vicinity of a front end edge of the first reflector 14 to a front side centering on the optical axis Ax, fixedly supports an outer peripheral edge portion of the projection lens 18 at a front end portion thereof and fixedly supports the first reflector 14 at two upper and lower brackets 14*c* at a rear end portion thereof. Further, the holder 16 is fixedly supported by the third reflector 26 at a right side portion of a rear end thereof.

The second reflector 24 is arranged on a rear side of the first reflector 14 and reflects light directed to a rear side from the light source 12*a* by way of the opening portion 14*b* of the first reflector 14 to direct to the front side to be proximate to the optical axis Ax. A reflecting face 24*a* of the second reflector 24 is formed with a shape of an ellipsoid of revolution constituting a center axis thereof by the optical axis Ax. At that occasion, an ellipse E2 including the optical axis Ax of the ellipsoid of revolution constituting the reflecting face 24*a* constitutes a first focal point by the center position A of the light source 12*a* and constitutes a second focal point by the rear focal point F of the projection lens 18, and a distance between the first focal point and an apex point on a rear side is set to a value substantially the same as a distance between the first and the second focal points. Further, an outer peripheral edge of the reflecting face 24*a* is provided with a shape of a circle having a diameter more or less smaller than an effective diameter of the projection lens 18.

The third reflector 26 is arranged at a surrounding of the second reflector 24 to be formed integrally with the second reflector 24 and reflects light from the light source 12*a* to a front side without transmitting through the projection lens 18. A reflecting face 26*a* of the third reflector 26 is constituted by forming a plurality of diverging reflecting elements 26*s* in a shape of a vertical stripe by constituting a reference face by a paraboloid of revolution P constituting a center axis thereof by the optical axis Ax and constituting a focal point thereof by the center position A of the light source 12*a*. At that occasion, a focal length of the paraboloid of revolution P is set to a value substantially the same as the distance between the first focal point and the apex point on the rear side of the ellipse E2.

A right side region of the optical axis Ax in the reflecting face 26*a* of the third reflector 26 is formed with a bulb inserting and fixing portion 26*b* to project from the reflecting face 26*a*. Further, a left side face portion of the bulb inserting and fixing portion 26*b* is formed with a bulb inserting hole 26*c* for inserting and fixing the light source bulb 12.

Figure 6:
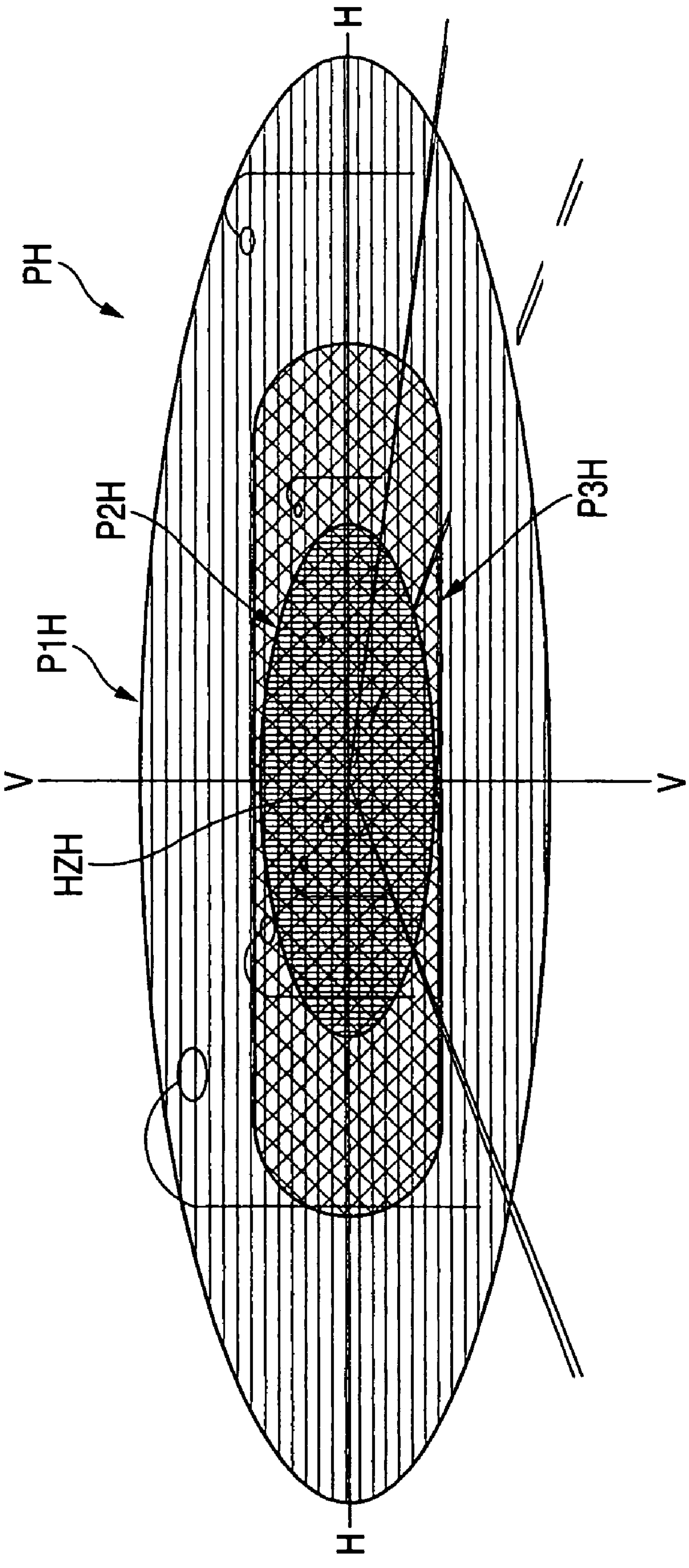
FIG. 6 is a diagram perspectively showing a light distribution pattern for a high beam formed on an imaginary vertical screen arranged at a position of 25 m frontward from a lamp piece by light irradiated from the vehicle headlamp to a front side.

FIG. 6 is a diagram perspectively showing a light distribution pattern for a high beam formed on an imaginary vertical screen arranged at a position 25 m frontward from the lamp piece by light irradiated from the vehicle headlamp 10 to a front side.

As shown by the diagram, the light distribution pattern PH for a high beam is constituted as a synthesized light distribution pattern of three light distribution patterns P1H, P2H, P3H.

The light distribution pattern P1H is a light distribution pattern formed by light from the light source 12*a* after being reflected by the reflecting face 14*a* of the first reflector 14 and transmitting through the projection lens 18 and is formed as an inverted projected image of a light source image formed on the rear focal face of the projection lens 18 (that is, focal face including the rear focal point F).

The light distribution pattern P1H is formed as a transversely prolonged light distribution pattern expanded considerably in a left and right direction centering on H-V constituting a vanishing point in a front direction of the lamp piece to ensure a diverging angle necessary as the light distribution pattern for a high beam. The light distribution pattern P1H is formed as the light distribution pattern expanded considerably in the left and right direction in this way because the light source 12*a* is constituted as the line segment light source extended in the vehicle width direction and the eccentricity of the ellipse constituting the sectional shape of the reflecting face 14*a* of the first reflector 14 is set to increase gradually from the vertical section to the horizontal section.

The light distribution pattern P2H is a light distribution pattern formed by light from the light source 12*a* after being reflected by the reflecting face 24*a* of the second reflector 24 and transmitting through the projection lens 18 and is formed as inverted projected image of a light source image formed on the rear focal face of the projection lens 18.

The light distribution pattern P2H is formed as a transversely prolonged light distribution pattern in a spot-like shape centering on H-V, thereby, a hot zone HZH is formed at a vicinity of H-V. The light distribution pattern P2H is formed as the light distribution pattern in the spot-like shape in this way because the reflecting face 24*a* of the second reflector 24 is constituted by the ellipsoid of revolution. At that occasion, the light distribution pattern P2H is formed as the transversely prolonged light distribution pattern because the light source 12*a* is constituted as the line segment light source extended in the vehicle width direction.

The light distribution pattern P3H is a light distribution pattern formed by light from the light source 12*a* after being reflected by the reflecting face 26*a* of the third reflector and irradiated to the front side without passing through the projection lens.

The light distribution pattern P3H is formed as a transversely prolonged light distribution pattern expanded in the left and right direction to some degree centering on H-V constituting the vanishing point in the lamp piece front face direction, thereby, a brightness at a surrounding of the hot zone HZH is intensified. The light distribution pattern P3H is formed as the light distribution pattern expanded to some degree in the left and right direction in this way because the reflecting face 26*a* of the third reflector 26 is constituted by the plurality of diverging reflecting elements 26*s*. At that occasion, the light source 12*a* is constituted as the line segment light source extended in the vehicle width direction and therefore, a width of the light distribution pattern P3H in the up and down direction becomes considerably narrow.

As has been explained above, the vehicle headlamp 10 according to the embodiment is constituted as the lamp piece unit of the projector type, the light source 12*a* is constituted as the line segment light source extended in the vehicle width direction and arranged at the position at which the distance L from the center portion A to the rear focal point F of the projection lens 18 becomes the value smaller than the focal length f of the projection lens 18, further, the region of the rear portion of the first reflector 14 proximate to the optical axis is formed as the opening portion 14*b*, the rear side of the first reflector 14 is provided with the second reflector 24 for reflecting light directed to the rear side from the light source 12*a* by way of the opening portion 14*b* to the front side to be proximate to the optical axis Ax and therefore, the following operation and effect can be achieved.

That is, the light source 12*a* is constituted as the line segment light source extended in the vehicle width direction and therefore, the inverted projected image of the light source 12*a* formed by the projection lens 18 can be made to constitute the image having substantially the transversely prolonged rectangular shape extended to be long in the horizontal direction, thereby, the light distribution pattern PH for a high beam can easily be formed as the transversely prolonged light distribution pattern having a small nonuniformity in light distribution.

Further, the distance L from the center portion A of the light source 12*a* to the rear focal point F is set to the value smaller than the focal length f of the projection lens 18 and therefore, the solid angle of the reflecting face 14*a* relative to the light source 12*a* can be increased by making the first reflector 14 small-sized, thereby, much of light emitted from the light source 12*a* can be made to be incident on the reflecting face 14*a* of the first reflector 14.

However, although when the first reflector 14 is downsized in this way, the inverted projected image of the light source 12*a* formed by the projection lens 18 is enlarged, the light source 12*a* is the line segment light source extended in the vehicle width direction, the inverted projected image is enlarged while making the image stay substantially in the transversely prolonged rectangular shape and therefore, the transversely prolonged light distribution pattern can be maintained.

Further, although when the first reflector 14 is downsized in this way, the rear portion is liable to interfere with the light source bulb 12, the region of the rear portion of the first reflector 14 proximate to the optical axis is formed as the opening portion 14*b* and therefore, such an interference can be prevented from being brought about beforehand. Further, the rear side of the first reflector 14 is provided with the second reflector 24 for reflecting light directed to the rear side from the light source 12*a* by way of the opening portion 14*b* to the front side to be proximate to the optical axis Ax and therefore, by forming the opening portion 14*b*, much of light from the light source 12*a* which cannot be made to be incident on the reflecting face 14*a* of the first reflector 14 can be made to be incident on the reflecting face 24*a* of the second reflector 24, thereby, the light flux of the light source can effectively be utilized. Further, the reflecting light from the second reflector 24 transmits through the projection lens 18 to be irradiated to the front side as the light directed to the front side to be proximate to the optical axis Ax and therefore, an inversion projecting control by the projection lens 18 can be carried out.

In this way, according to the embodiment, in the vehicle headlamp 10 of the projector type, thin formation of the lamp piece is achieved, the transversely prolonged light distribution pattern having a small nonuniformity in light distribution can be formed and the efficiency of utilizing the light flux of the light source can be increased.

Further, according to the embodiment, from the center position A of the light source 12*a* to the projection lens 18, further, according to the embodiment, the light source 12*a* is constituted by the light emitting portion of the light source bulb 12 inserted to be fixed by the third reflector 26 from the side direction of the optical axis Ax and therefore, thin formation of the lamp piece can easily be realized. Further, when constituted in this way, the light source bulb having the line segment light source extended in the bulb center axis Ax1 direction can be used as in the light source bulb 12 and therefore, a width of selecting a kind of the light source bulb can be widened.

Further, according to the embodiment, a surrounding of the second reflector 14 is provided with the third reflector 26 for emitting light from the light source 12*a* to the front side without transmitting the light through the projection lens 18 and therefore, also with regard to light which cannot be made to be incident on the reflecting face 24*a* of the second reflector 24 in light from the light source 12*a* directed to the rear side by way of the opening portion 14*b* formed at the region of the rear portion of the first reflector 14 proximate to the optical axis, much of the light can be made to be incident on the reflecting face 24*a* of the third reflector 16, thereby, the efficiency of utilizing the light flux of the light source can further be increased.

Figure 7:
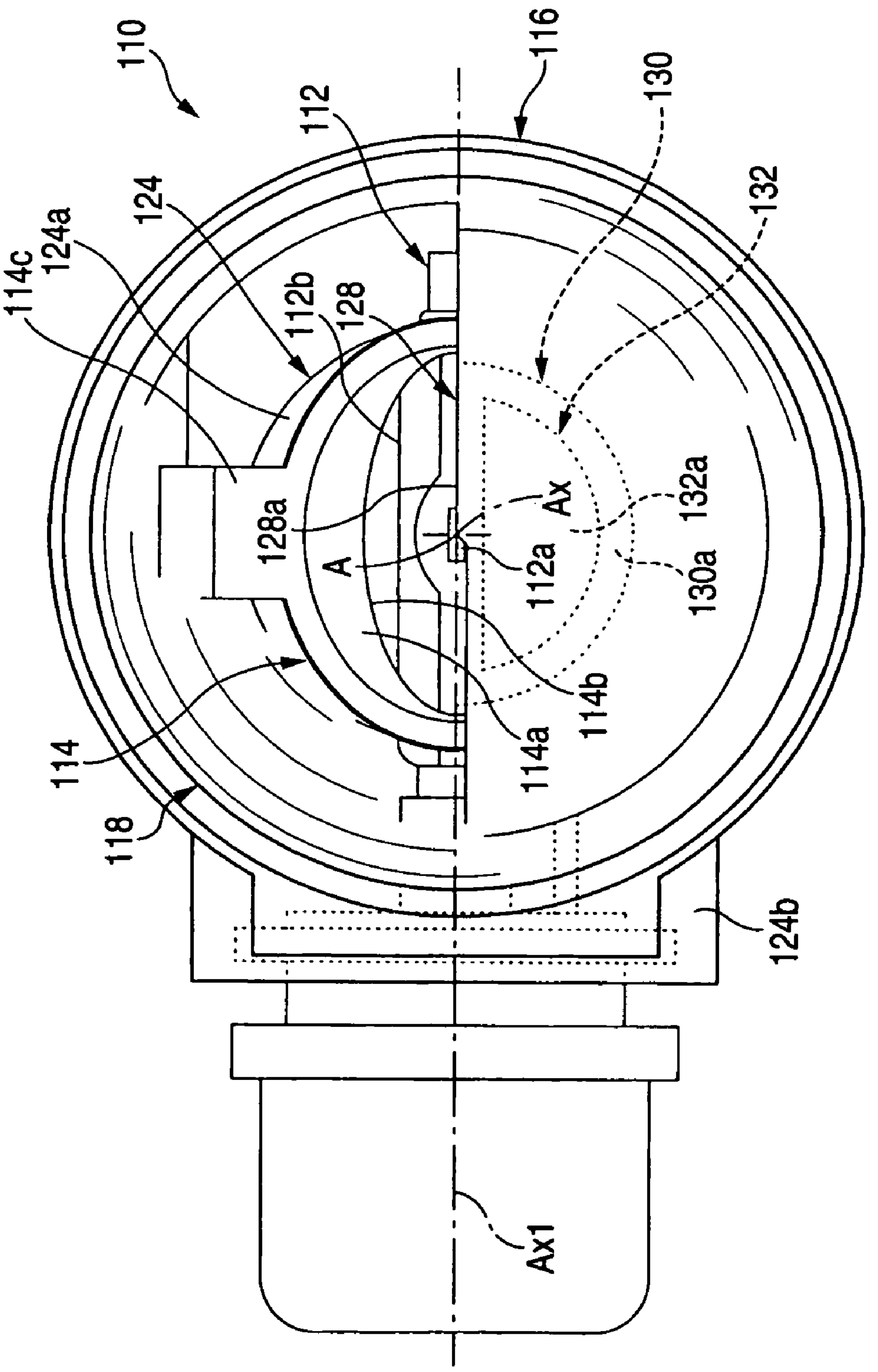
FIG. 7 is a front view showing a vehicle headlamp according to a second exemplary embodiment of the invention.
Figure 8:
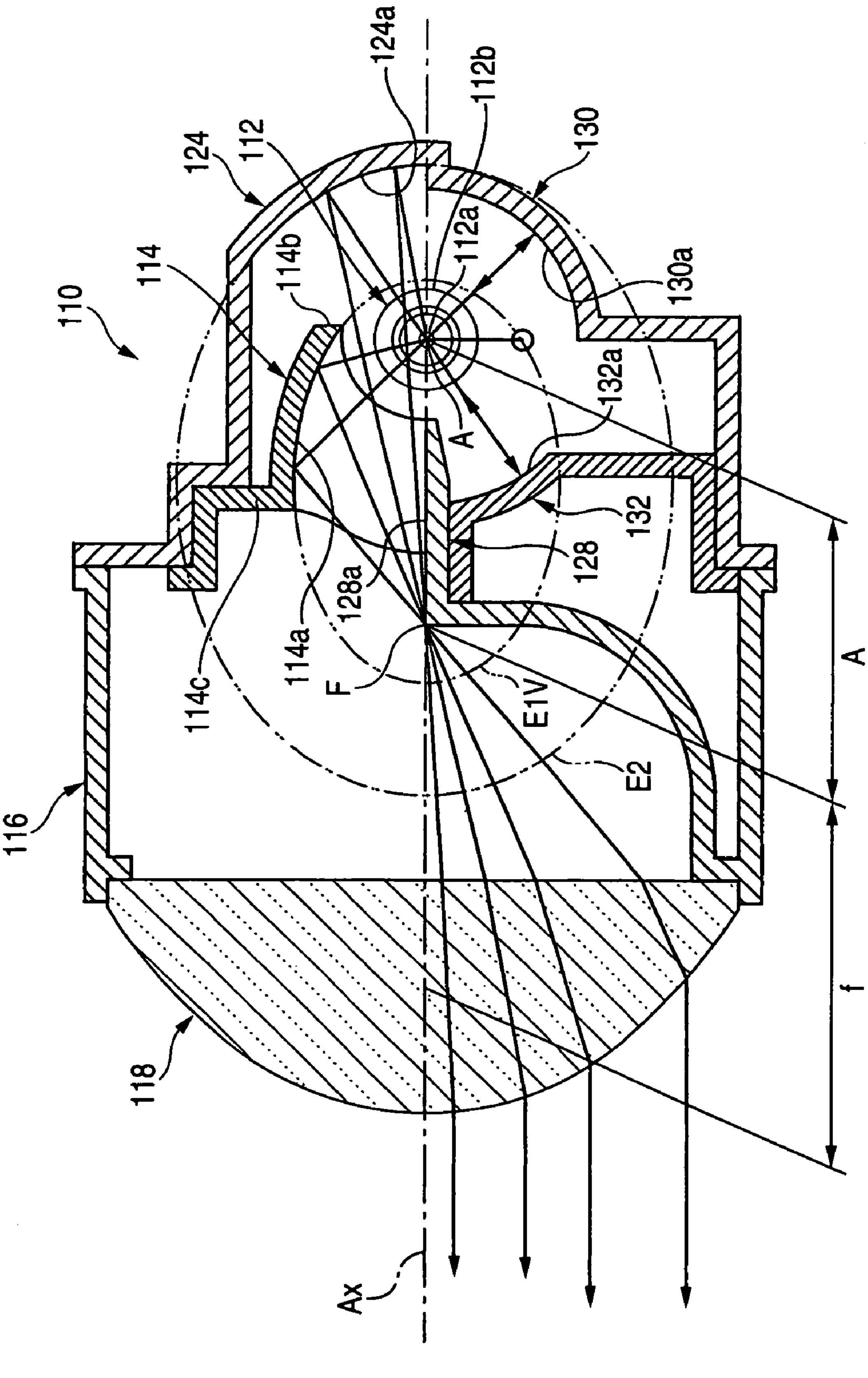
FIG. 8 is a side sectional view showing the vehicle headlamp.
Figure 9:
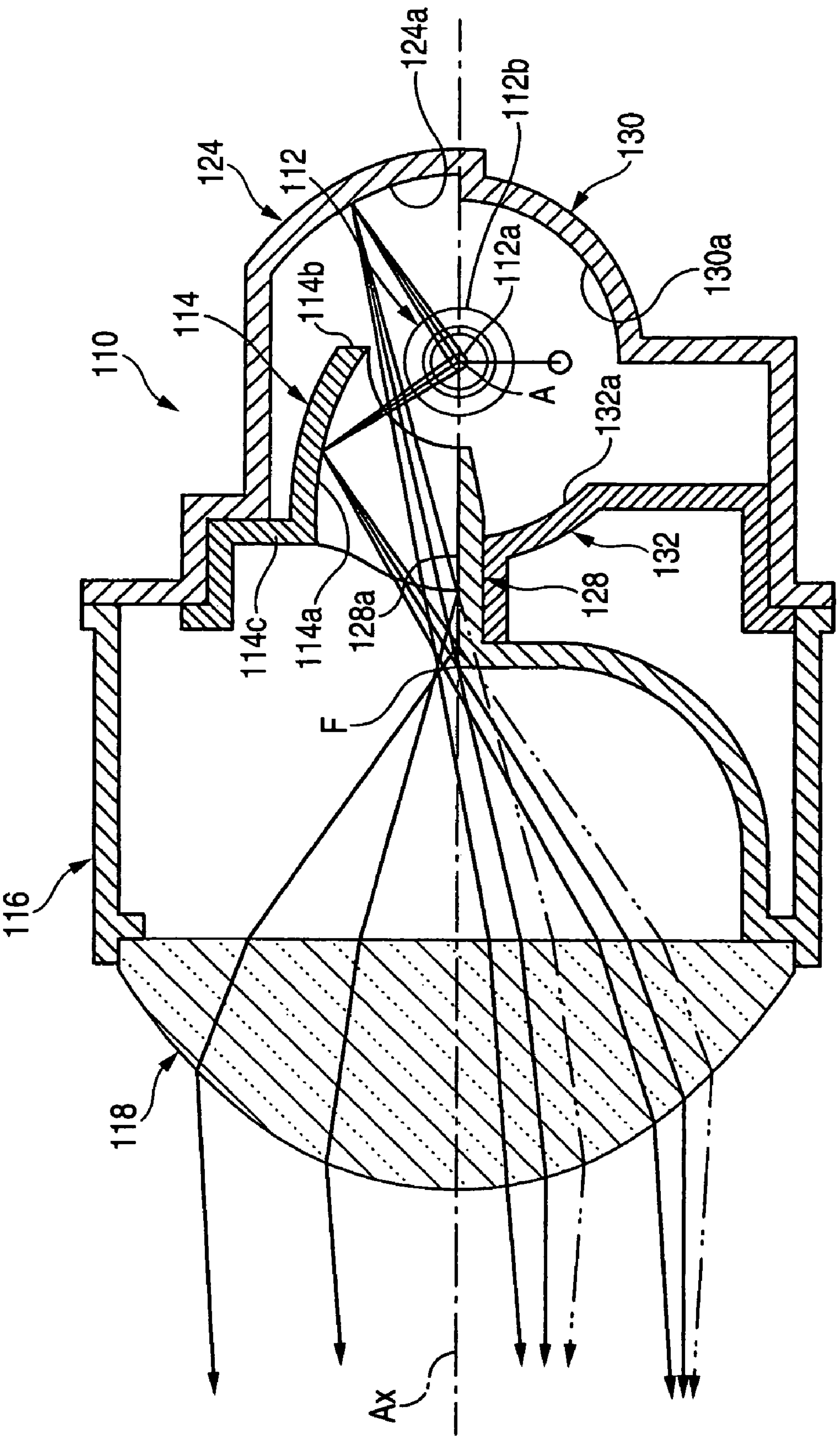
FIG. 9 is a side sectional view showing the vehicle headlamp by attracting attention to an optical path of light emitted from respective portions of a light source thereof.
Figure 10:
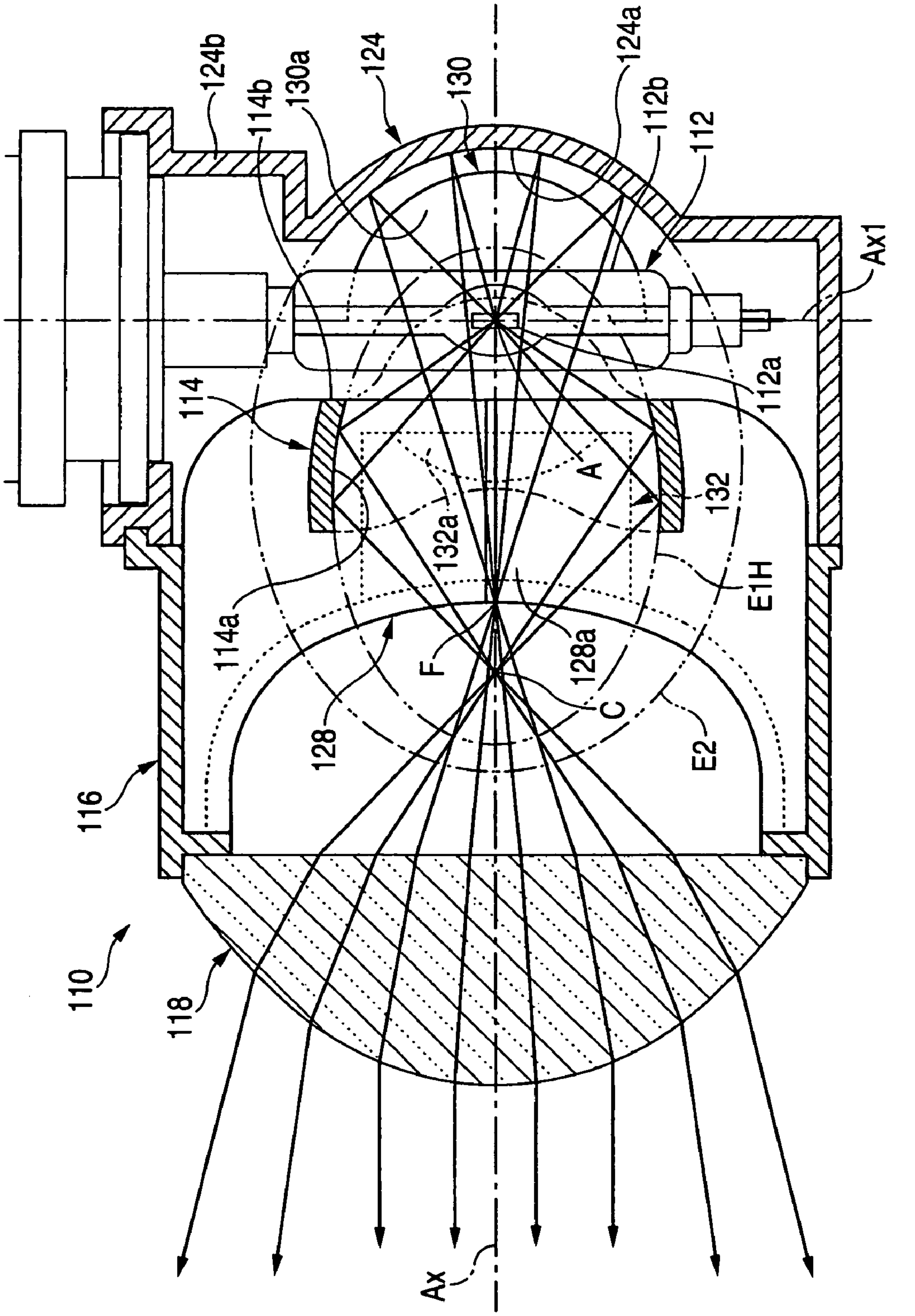
FIG. 10 is a horizontal sectional view showing the vehicle headlamp.
Figure 11:
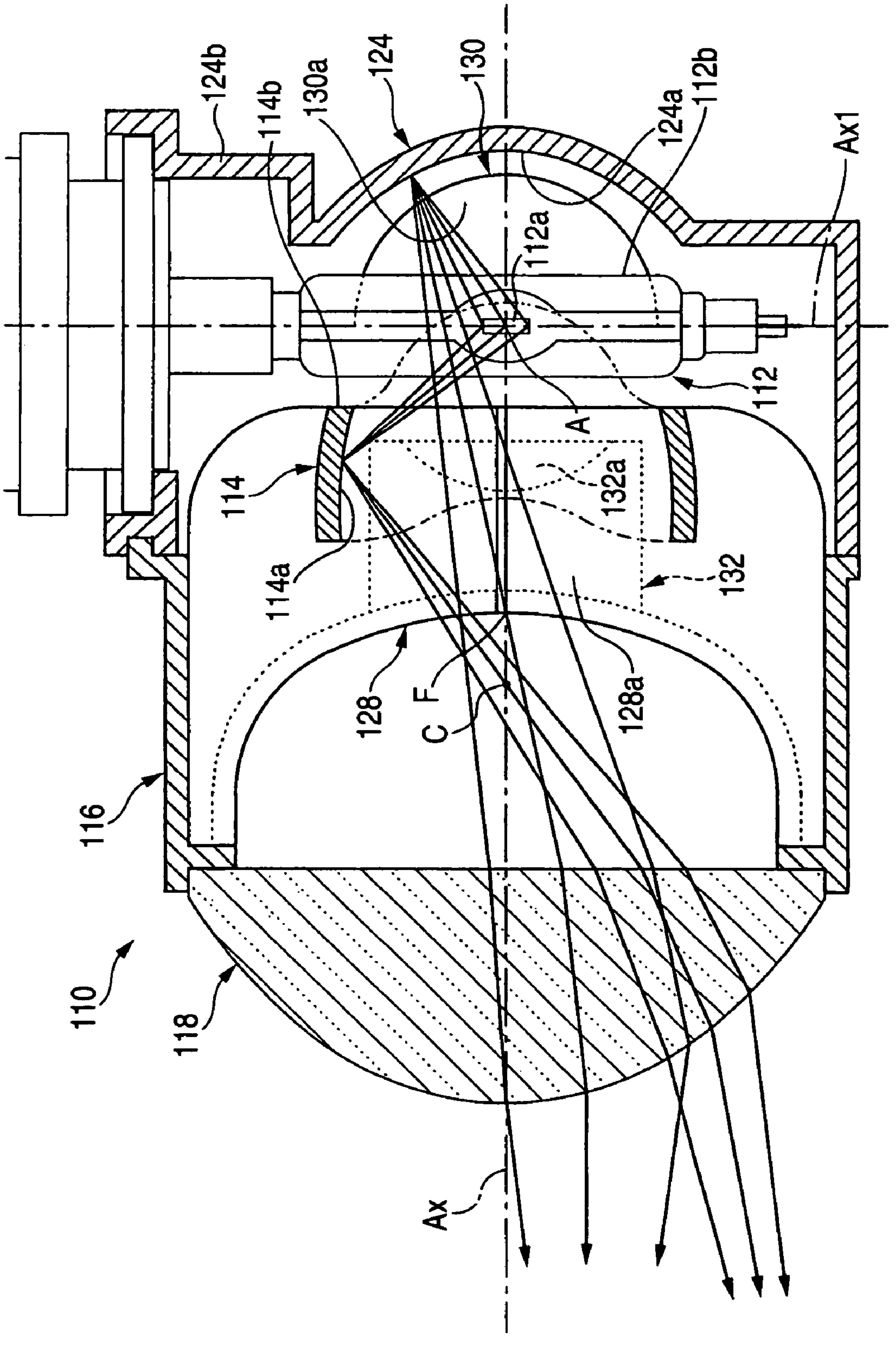
FIG. 11 is a horizontal sectional view showing the vehicle headlamp by attracting attention to the optical path of light emitted from the respective portions of the light source.

FIG. 7 is a front view showing a vehicle headlamp according to a second exemplary embodiment, FIGS. 8 and 9 are side sectional views thereof and FIGS. 10 and 11 are horizontal vertical views thereof.

As shown by the drawings, a vehicle headlamp 110 according to the embodiment is constituted as a lamp piece unit of a projector type for irradiating light for forming a light distribution pattern for a low beam and is used in a state of being integrated to a lamp body or the like, not illustrated.

The vehicle headlamp 110 is constituted by including a light source bulb 112, a first reflector 114, a second reflector 124, a holder 116, a projection lens 118, a mirror member 128, a fourth reflector 130 and a fifth reflector 132 and is provided with an optical axis Ax extended in a longitudinal direction of a vehicle. Incidentally, the vehicle headlamp 110 is arranged in a state of extending an optical axis Ax thereof in a downward direction by about 0.5 through 0.60° relative to a longitudinal direction of a vehicle.

Constitutions of the light source bulb 112 and the projection lens 118 are quite similar to those of the light source bulb 12 and the projection lens 18 of the first embodiment.

The light source bulb 112 is inserted to be fixed by the second reflector 124 from a right side direction on a side rearward from the rear focal point F of the projection lens 118. The light source bulb 112 is inserted to fix to position the center position A of the light source 112*a* on the optical axis Ax in a state of fitting to extend the bulb center axis Ax1 in a vehicle width direction.

At that occasion, a position in a longitudinal direction of the light source bulb 112 is set to a position at which the distance L from the center position A of the light source 112*a* to the rear focal point F of the projection lens 118 becomes a value smaller than the focal distance of the f projection lens 118 (for example, position constituting a value of about 0.4f through 0.8f).

The first reflector 114 is a small-sized reflector arranged to surround the optical axis Ax substantially in a semicylindrical shape from an upper side at a vicinity of a front side of the light source 112*a* and includes the reflecting face 114*a* for reflecting light from the light source 112*a* to a front side to be proximate to the optical axis Ax. The reflecting face 114*a* is set to an elliptical shape in a sectional shape thereof including the optical axis Ax and the eccentricity is set to be gradually increased from a vertical section to a horizontal section. That is, as shown by FIG. 8, the ellipse E1V constituting a vertical section including the optical axis Ax constitutes the first focal point by the center position A of the light source 112*a* and constitutes the second focal point by the rear focal point F of the projection lens 118, as shown by FIG. 10, the ellipse E1H constituting a horizontal section including the optical axis Ax constitutes the first foal point by the center position A of the light source 112*a* and constitutes the second focal point by the point C disposed on the front side of the rear focal point F of the projection lens 118 to some degree. Further, thereby, light emitted from the projection lens 118 is diverged considerably in the left and right direction without being diverged in the up and down direction.

The front end edge of the first reflector 114 is formed to be more extended to front side portions thereof disposed on two left and right sides thereof than a portion thereof disposed right above the optical axis Ax, thereby, light from the light source 112*a* is made to be incident on the projection lens 118 as much as possible.

A region of the rear portion of the first reflector 114 proximate to the optical axis Ax is formed as the opening portion 114*b*. The opening portion 114*b* is formed to surround a shroud tube 112*b* of the light source bulb 112 at a predetermined interval therefrom, thereby, light from the light source 112*a* is made to be incident on the reflecting face 114*a* of the first reflector 114 as much as possible after avoiding interference with the shroud tube 112*b*.

The upper portion of the front end edge of the first reflector 114 is formed with the bracket 114*c* for positioning to fix the first reflector 114 to the second reflector 124.

The second reflector 124 is arranged to be disposed on an upper side of the optical axis Ax on the rear side of the first reflector 114 for reflecting light directed to the rear side from the light source 112*a* by way of the opening portion 114*b* of the first reflector 114 to the front side to be proximate to the optical axis Ax. A reflecting face 124*a* of the second reflector 124 is formed in a shape of an ellipsoid of revolution constituting a center axis thereof by the optical axis Ax. At this occasion, an ellipse E2 including the optical axis Ax of the ellipsoid of revolution constituting the reflecting face 124*a* constitutes a first focal position by the center position A of the light source 122*a* and constitutes a second focal point by the rear focal point F of the projection lens 118 and a distance between the first focal point and an apex on the rear side is set to a value slightly smaller than a distance between the first and the second focal points. Further, an outer peripheral edge of the reflecting face 124*a* is provided with a semicircular shape having a diameter smaller than the effective diameter of the projection lens 118 and a lower end edge thereof is disposed at a height of a horizontal face including the optical axis Ax.

A right side region of the optical axis Ax in the second reflector 124 is formed with a bulb inserting and fixing portion 124*b* for inserting to fix the light source bulb 112.

The holder 116 is a member formed to extend in a cylindrical shape from the position of the first reflector 114 proximate to a front end edge thereof to the front side and fixedly supports the outer peripheral edge portion of the projection lens 118. Further, the holder 116 is fixedly supported by the second reflector 124 at a right side portion of a rear end thereof.

A mirror member 128 is a member including an upward directed reflecting face 128*a* extended to a rear side from the rear focal point F of the projection lens 118 between the light source 112*a* and the projection lens 118 and is integrally formed with the holder 116.

The upward directed reflecting face 128*a* of the mirror member 128 is constituted by a horizontal face including the optical axis Ax at a left side region thereof disposed on a left side of the optical axis Ax and a right side region thereof disposed on a right side of the optical axis Ax is constituted by a horizontal face one stage lower than that of the left side region by way of a short inclined face. Further, a front end edge of the upward directed reflecting face 128*a* is formed to extend substantially in a shape of a circular arc along a rear side focal point face of the projection lens 118. Thereby, the mirror member 128 makes portions of reflected light from the first and second reflectors 114, 124 reflected upward to be incident on the projection lens 118 at the upward directed reflecting face and the portions are emitted from the projection lens 118 as downward directed light.

The first reflector 114 is fixedly supported by the second reflector 124 at the bracket 114*c* in a state of mounting a lower end face of a peripheral edge thereof at the upward directed reflecting face 128*a*.

The fourth reflector 130 is arranged on a skewed lower side of the rear side of the light source 112*a* and includes a reflecting face 130*a* in a spherical shape centering on the center position A of the light source 112*a*. An outer peripheral edge of the reflecting face 130*a* is provided with a semicircular shape having a diameter smaller than the effective diameter of the projection lens 118 and an upper end edge thereof is disposed at the height of the horizontal face including the optical axis Ax. Thereby, light directed to the skewed lower side of the rear side from the light source 112*a* is returned to the light source 112*a* at the reflecting face 130*a* to be incident on the reflecting face 114*a* of the first reflector 114 as quasi diverging light from the light source 112*a*. The fourth reflector 130 is integrally formed with the second reflector 124.

The fifth reflector 132 is arranged on a skewed lower side of a front side of the light source 112*a* and includes a reflecting face 132*a* in a spherical shape centering on the center position A of the light source 112*a*. An outer peripheral edge of the reflecting face 132*a* is provided with a semicircular shape having a diameter smaller than the effective diameter of the projection lens 118 and an upper end edge thereof is disposed at a height slightly lower than the optical axis Ax. Thereby, the fifth reflector 132 returns light directed to a skewed lower side on a front side from the light source 112*a* to the light source 112*a* at the reflecting face 132*a* to be incident on the reflecting face 124*a* of the second reflector 124 as quasi diverging light from the light source 112*a*. The fifth reflector 132 is positioned to be fixed by the second reflector 124 to be interposed by the mirror member 128 and a bottom face wall of the second reflector 124.

Figure 12:
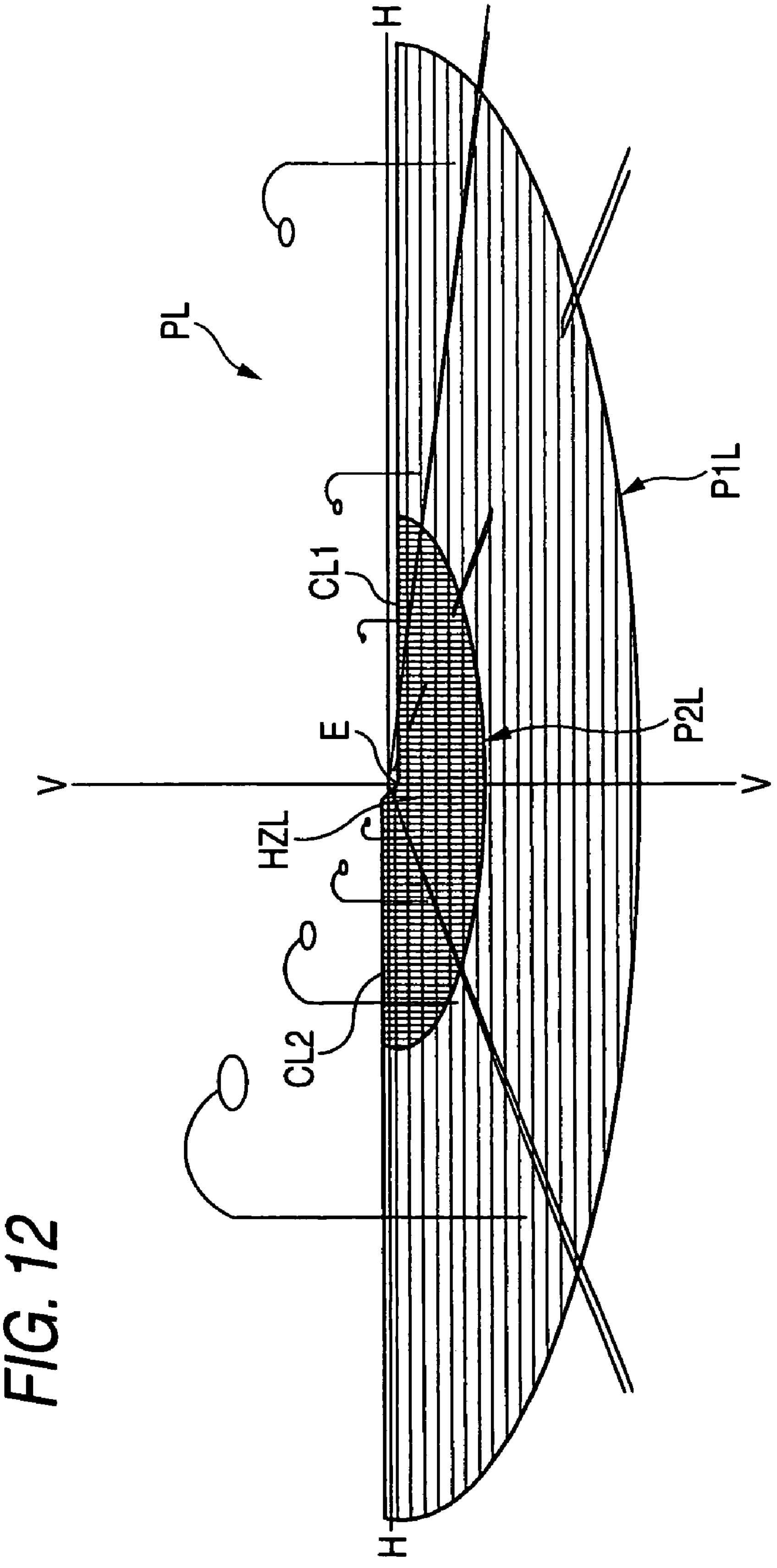
FIG. 12 is a diagram perspectively showing a light distribution pattern for a high beam formed on an imaginary vertical screen arranged at a position of 25 m frontward from a lamp piece by light irradiated to a front side from the vehicle headlamp.

FIG. 12 is a diagram perspectively showing a light distribution pattern for a lower beam formed on an imaginary vertical screen arranged at a position 25 m forward from the lamp piece by light irradiated from the vehicle headlamp 110 to a front side.

As shown by the drawing, a light distribution pattern PL for a low beam is a light distribution pattern for a low beam of a left light distribution and includes cut off lines CL1, CL2 having a stepped difference in a left and right direction at an upper end edge thereof. The cut off lines CL1, CL2 are extended in a horizontal direction with the stepped difference in the left and right direction by constituting a boundary by a line V-V passing H-V in a vertical direction, an opposed lane side portion on a right side of the line V-V is formed as the lower stage cut off line CL1 and a driving lane side portion thereof on a left side of the line V-V is formed as an upper stage cut off line CL2 stepped up from the lower stage cut off line CL1 by way of an inclined portion.

In the light distribution pattern PL for a low beam, an elbow point E constituting an intersection of the lower stage cut off line CL1 and the line V-V is disposed on a lower side of H-V by about 0.5 through 0.6°. This is because the optical axis Ax is extended in the downward direction by about 0.5 through 0.6° relative to the longitudinal direction of the vehicle. Further, in the light distribution pattern PL for a low beam, a hot zone HZL constituting a high light intensity region is formed to surround the elbow point E.

The light distribution pattern PL for a low beam is constituted as a light distribution pattern synthesized with two light distribution patterns P1L, P2L.

The light distribution pattern P1L is a light distribution pattern formed by light from the light source 112*a* after being reflected by the reflecting face 114*a* of the first reflector 114 and transmitting through the projection lens 118, formed as an inverted projected image of a light source image formed on a rear focal point face of the projection lens 118 and formed as an inverted projected image of a front side edge of the upward direction reflecting face 26*a* of the mirror member 26.

The light distribution pattern P1L is formed as a transversely prolonged light distribution pattern considerably diverged in the left and right direction centering on the line V-V for ensuring a diverging angle necessary as the light distribution pattern for a low beam. The light distribution pattern P1L is formed as the light distribution pattern considerably diverged in the left and right direction in this way because the light source 112*a* is constituted as the line segment light source extended in the vehicle width direction and the eccentricity of the ellipse constituting the sectional shape of the reflecting face 114*a* of the first reflector 114 is set to be increased gradually from the vertical section to the horizontal section.

Reflected light from the first reflector 114 contributing to forming the light distribution pattern P1L is constituted by light directly incident on the reflecting face 114*a* from the light source 112*a* and light incident on the reflecting face 114*a* of the first reflector 114 after being reflected by the reflecting face 130*a* of the fourth reflector 130.

The light distribution pattern P2L is a light distribution pattern formed by light from the light source 112*a* reflected by the reflecting face 124*a* of the second reflector 124 and transmitting through the projection lens 118 and is formed as an inverted projected image of a light source image formed on the rear focal face of the projection lens 118.

The light distribution pattern P2L is formed as a transversely prolonged light distribution pattern in a spot-like shape centering on the line V-V, thereby, the hot zone HZL is formed. The light distribution pattern P2L is formed as the light distribution pattern in the spot-like shape in this way because the reflecting face 124*a* of the second reflector 124 is constituted by the ellipsoid of revolution. At that occasion, the light distribution pattern P2L is formed as the transversely prolonged light distribution pattern because the light source 112*a* is constituted as the line segment light source extended in the vehicle width direction.

Reflected light from the second reflector 124 contributing to forming the light distribution pattern P2L is constituted by light directly incident on the reflecting face 124*a* from the light source 112*a* and light incident on the reflecting face 124*a* of the second reflector 124 after having being reflected by the reflecting face 132*a* of the fifth reflector 132.

As has been explained in details, the vehicle headlamp 110 according to the embodiment is constituted as the lamp piece unit of the projector type, the light source 112*a* is constituted as the line segment light source extended in the vehicle width direction and arranged at the position at which the distance L from the center position A to the rear focal point F of the projection lens 118 becomes the value smaller than the focal length f of the projection lens 118, further, the region of the rear portion of the first reflector 114 proximate to the optical axis is formed as the opening portion 114*b*, the rear side of the first reflector 114 is provided with the second reflector 124 for reflecting light directed to the rear side from the light source 112*a* by way of the opening portion 114*b* to the front side to be proximate to the optical axis Ax and therefore, the following operation and effect can be achieved.

That is, the light source 112*a* is constituted as the line segment light source extended in the vehicle width direction and therefore, the inverted projected image of the light source 112*a* formed by the projection lens 118 can be formed to be the image substantially in the transversely prolonged rectangular shape prolonged to be long in the horizontal direction, thereby, the light distribution pattern PL for a low beam can easily be formed as the transversely prolonged light distribution pattern having a small nonuniformity in light distribution.

Further, the distance L from the center position A of the light source 112*a* to the rear focal point F of the projection lens 118 is set to the value smaller than the focal length f of the projection lens 118 and therefore, the solid angle of the reflecting face 114*a* relative to the light source 112*a* can be increased by downsizing the first reflector 114, thereby, much of light emitted from the light source 112*a* can be made to be incident on the reflecting face 114*a* of the first reflector 114.

However, although when the first reflector 114 is downsized in this way, the inverted projected image of the light source 112*a* formed by the projection lens 118 is enlarged, the light source 112*a* is the line segment light source extended in the vehicle width direction, the inverted projected image is enlarged while making the inverted projected image stay in the image having substantially the transversely prolonged rectangular shape and therefore, the transversely prolonged light distribution pattern can be maintained.

Further, although when the first reflector 114 is downsized in this way, the rear portion is liable to interfere with the light source bulb 112, a region of the rear portion of the first reflector 114 proximate to the optical axis is formed as the opening portion 114*b* and therefore, such an interference can be prevented from being brought about beforehand. First, the rear side of the first reflector 114 is provided with the second reflector 124 for reflecting light directed to the rear side from the light source 112*a* by way of the opening portion 114*b* to the front side to be proximate to the optical axis Ax and therefore, by forming the opening portion 114*b*, much of light from the light source 112*a* which cannot be made to be incident on the reflecting face 114*a* of the first reflector 114 can be made to be incident on the reflecting face 124*a* of the second reflector 124, thereby, the light flux of the light source can effectively be utilized. Further, reflected light from the second reflector 124 is irradiated to the front side by transmitting through the projection lens 118 as light directed to the front side to be proximate to the optical axis Ax and therefore, the inversion projecting control by the projection lens 118 can be carried out.

In this way, according to the embodiment, in the vehicle headlamp 110 of the projector type, the efficiency of utilizing the light flux of the light source can be increased after achieving thin formation of the lamp piece and enabling to form the transversely prolonged light distribution pattern having a small nonuniformity in light distribution.

Further, according to the embodiment, the light source 112*a* is constituted by the light emitting portion of the light source bulb 112 inserted to be fixed by the second reflector 124 from the side direction of the optical axis Ax and therefore, thin formation of the lamp piece can easily be realized. Further, when constituted in this way, the light source bulb having the line segment light source extended in the direction of the bulb center axis Ax1 as in the light source bulb 112 can be used and therefore, a width of selecting a kind of the light source bulb can be widened.

Further, according to the embodiment, there is provided the mirror member 128 having the upward directed reflecting face 128*a* extended from the rear focal point F of the projection lens 118 to the rear side to reflect portions of the reflected light from the first and second reflectors 114, 124 to the upper side between the light source 112*a* and the projection lens 118 and therefore, the following operation and effect can be achieved.

Further, light incident on the upward directed reflecting face 128*a* of the mirror member 128 in reflecting light from the first and second reflectors 114, 124 can be reflected to the upper side and therefore, the light distribution pattern PL for a low beam having the clear cut off lines CL1, CL2 at the upper end portion can be formed as the inverted reflected image of the front end edge of the upward directed reflecting face 128*a* and reflected light from the first and second reflectors 114, 124 can effectively be utilized as front irradiating light.

Further, according to the embodiment, the skewed lower side of the light source 112*a* is provided with the fourth reflector 130 including the reflecting face 130*a* in the spherical shape centering on the center position A of the light source 112*a* and therefore, light directed to the skewed lower side on the rear side from the light source 112*a* is reflected by the fourth reflector 130 to return to a vicinity of the light source 112*a*, the light can be made to be incident on the first reflector 114 as diverging light from the vicinity of the light source 112*a*, thereby, the efficiency of utilizing the light flux of the light source can further be increased.

Further, according to the embodiment, the skewed lower side on the front side of the light source 112*a* is provided with the fifth reflector 132 including the reflecting face 132*a* in the spherical shape centering on the center position of the light source 112*a* and therefore, light directed to the skewed lower side on the front side from the light source 112*a* is reflected by the fifth reflector 132 to return to the vicinity of the light source 112*a*, the light can be made to be incident on the second reflector 124 as diverging light from the vicinity of the light source 112*a*, thereby, the efficiency of utilizing the light flux of the light source can further be increased.

Further, instead of returning light from the light source 112*a* to the vicinity of the light source 112*a* by the fourth and the fifth reflectors 130, 132 as in the second exemplary embodiment, there can be constructed a constitution in which a reflecting film is formed at the shroud tube 112*b* of the light source bulb 112 and light from the light source 112*a* is returned to the vicinity of the light source 112*a* by the reflecting film.

Figure 13:
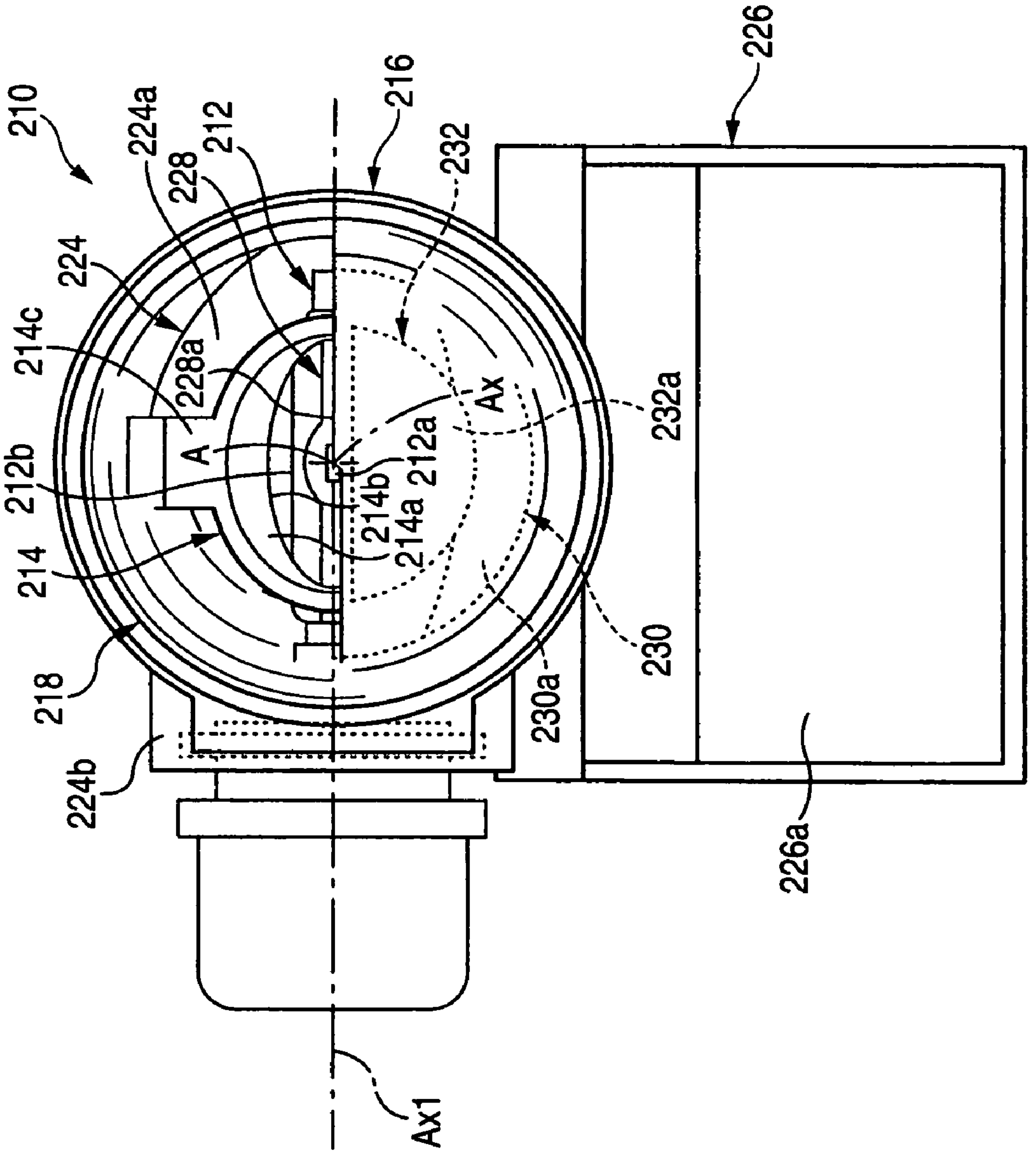
FIG. 13 is a front view showing a vehicle headlamp according to a third exemplary embodiment of the invention.
Figure 14:
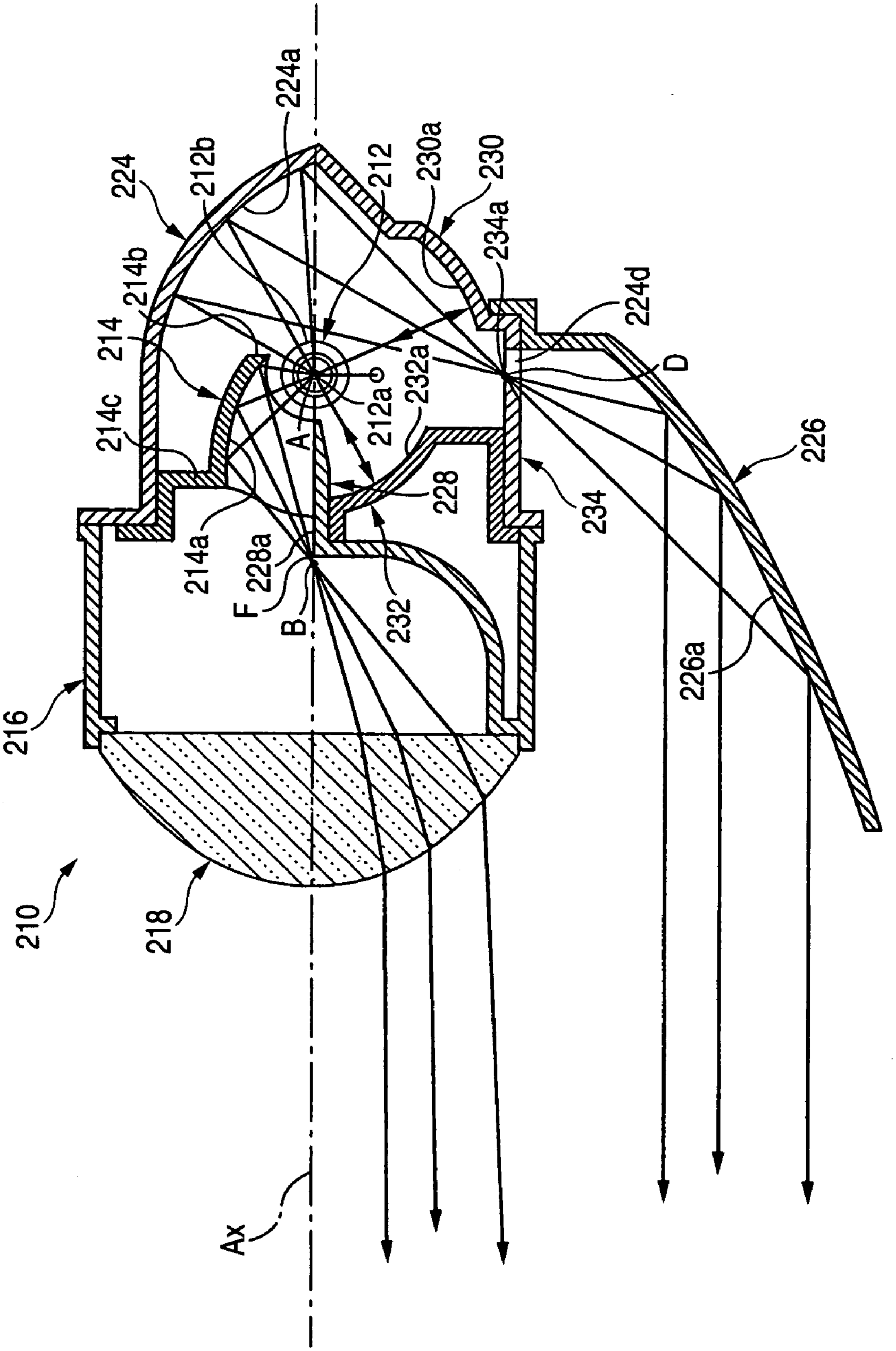
FIG. 14 is a side sectional view showing the vehicle headlamp.
Figure 15:
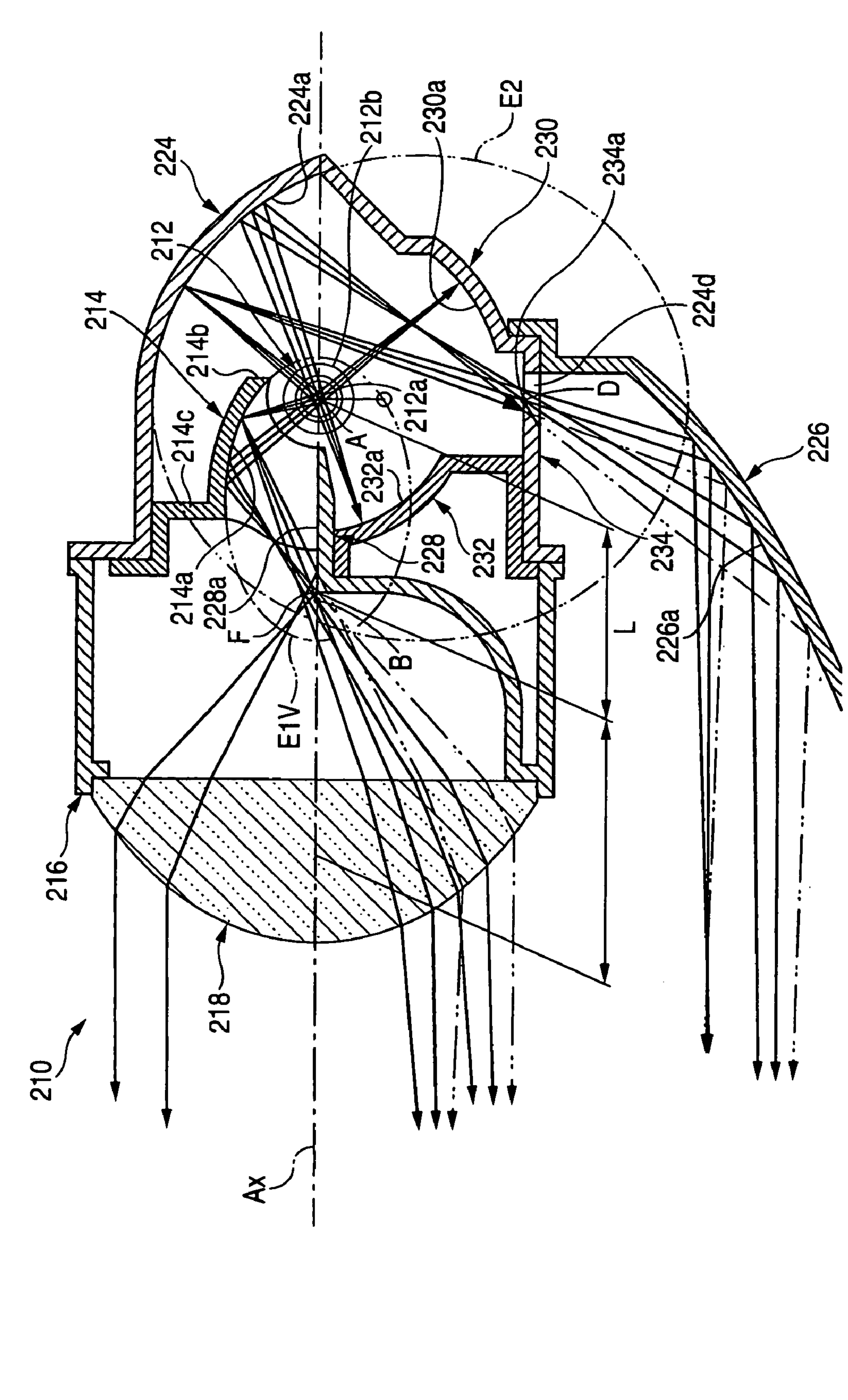
FIG. 15 is a side sectional view of the vehicle headlamp by paying attention to optical paths of light emitted from respective portions of a light source thereof.
Figure 16:
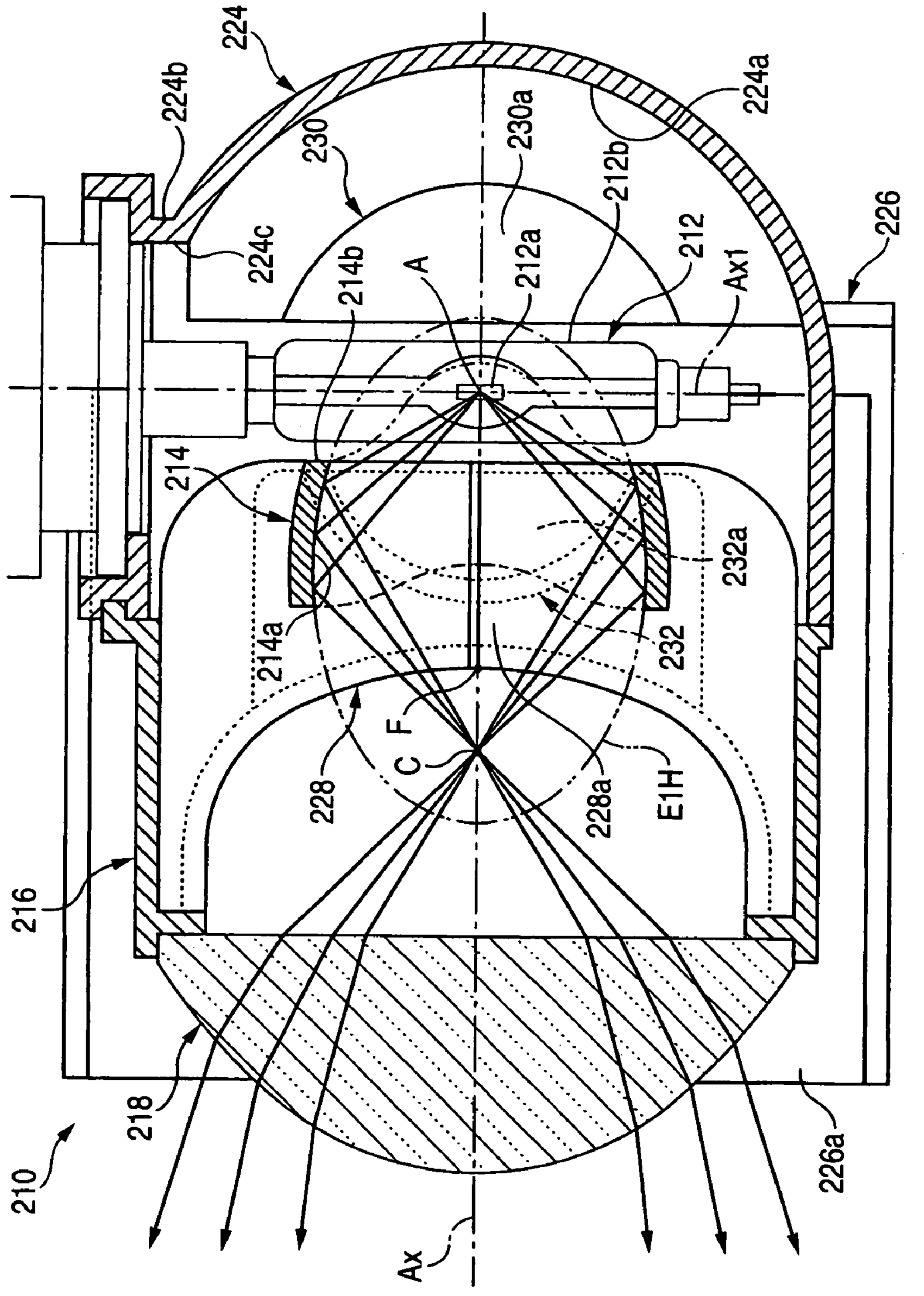
FIG. 16 is a horizontal sectional view showing the vehicle headlamp.

FIG. 13 is a front view showing a vehicle headlamp according to a third exemplary embodiment of the invention, FIGS. 14 and 15 are side sectional views thereof and FIG. 16 is a horizontal sectional view thereof.

As shown by the drawings, a vehicle headlamp 210 according to the embodiment is constituted as a lamp piece unit of a projector type for irradiating light for forming a light distribution pattern for a low beam and is used in a state of being integrated to a lamp body or the like, not illustrated.

The vehicle headlamp 210 is constituted by including a light source bulb 212, a first reflector 214, a second reflector 224, a third reflector 226, a holder 216, a projection lens 218, a mirror member 228, a fourth reflector 230, a fifth reflector 232, and a light shielding plate 234 and is provided with an optical axis Ax extended in a longitudinal direction of a vehicle. However, the vehicle headlamp 210 is arranged in a state of extending the optical axis Ax in a downward direction relative to the longitudinal direction of the vehicle by about 0.5 through 0.6° at a stage of finishing to adjust aiming.

The projection lens 218 comprise a flat convex aspherical lens a surface on a front side of which is constituted by a convex face and a surface on a rear side of which is constituted by a plane. Further, the projection lens 218 projects an image on a focal face including a rear side focal point F on a rear side thereof as an inverted image on a vertical imaginary screen arranged on a front side of the lamp piece.

The light source bulb 212 is a discharge bulb of a metal halide bulb or the like constituting a light source 212*a* thereof by a discharge light emitting portion and the light source 212*a* is constituted as a line segment light source extended along a bulb center axis Ax1.

Further, the light source 212 is inserted to be fixed by the second reflector 224 from a right side direction on a rear side of the rear focal point F of the projection lens 218. The light source bulb 212 is inserted to be fixed thereby in a state of setting the bulb center axis Ax1 to extend in a horizontal direction in a vertical face orthogonal to the optical axis Ax (that is, in a state of setting the bulb center axis Ax1 to extend in the vehicle width direction), such that a center position (that is, a center position between discharge electrodes on the bulb center axis Ax1) A of the light source 212*a* is positioned on the optical axis Ax.

At that occasion, a position in the longitudinal direction of the light source bulb 212 is set to a position at which a distance L from the center position A of the light source 212*a* to the rear focal point F of the projection lens 18 becomes a value smaller than a focal length of the projection lens 218 (for example, a position constituting a value of about L=0.4f through 0.8f).

The first reflector 214 is a small-sized reflector arranged to surround the optical axis Ax substantially in a semicyrindrical shape from an upper side at a vicinity of a front side of the light source 212*a* and includes a reflecting face 214*a* for reflecting light from the light source 212*a* to a front side to be proximate to the optical axis Ax. A sectional shape including the optical axis Ax of the reflecting face 14*a* is set by an elliptical shape and an eccentricity thereof is set to gradually increase from a vertical section to a horizontal section. That is, as shown by FIG. 15, an ellipse E1V constituting the vertical section including the optical axis Ax constitutes a first focal point by the center position A of the light source 212*a* and constitutes a second focal point by a point B disposed slightly frontward from the rear focal point F of the projection lens 218, as shown by FIG. 16, an ellipse E1H constituting the horizontal section including the optical axis Ax constitutes a first focal point by the center position A of the light source 212*a* and constitutes a second focal point by a point C disposed on a front side of the rear focal point F of the projection lens 218 to some degree. Further, thereby, light emitted from the projection lens 218 is hardly diverged in an up and down direction and is considerably diverged in a left and right direction.

A front end edge of the first reflector 214 is formed to expand portions thereof disposed on two left and right sides thereof more to a front side than a portion thereof disposed right above the optical axis Ax, thereby, light from the light source 212*a* is made to be incident on the projection lens 218 as much as possible.

A region of a rear portion of the first reflector 214 proximate to the optical axis Ax is formed as an opening portion 214*b*. The opening portion 214*b* is formed to surround a shroud tube 212*b* of the light source bulb 212 at a predetermined interval therefrom, thereby, light from the light source 212*a* is made to be incident on the reflecting face 14*a* of the first reflector 214 as much as possible after avoiding interference with the shroud tube 212*b*.

An upper portion of the front end edge of the first reflector 214 is formed with a bracket 14*c* for positioning to fix the first reflector 214 to the second reflector 224.

The second reflector 224 is arranged to be disposed on an upper side of the optical axis Ax on a rear side of the first reflector 214. A reflecting face 224*a* of the second reflector 224 is formed in a shape of an ellipsoid of revolution constituting a center axis by a vertical axis line orthogonal to the optical axis Ax. At this occasion, an ellipse E2 including the center axis of the ellipsoid of revolution constituting the reflecting face 224*a* constitutes a first focal point by the center position A of the light source 212*a* and constitutes a second focal point by a point D disposed at a height substantially the same as that of a lower end edge of the projection lens 218 on a rear side of the first focal point. Further, an outer peripheral edge of the reflecting face 224*a* is provided with a semicircular shape having a diameter smaller than an effective diameter of the projection lens 218, and a lower end edge thereof is disposed at a height of a horizontal face including the optical axis Ax. Further, thereby, the second reflector 224 reflects light directed to a rear side from the light source 212*a* by way of the opening portion 214*b* of the first reflector 214 to direct to a skewed lower side on a front side to converge to the point D and to be incident on the third reflector 226 as the diverging light from the point D.

A right side region of the optical axis Ax of the second reflector 224 is formed with a bulb inserting and fixing portion 224*b* for inserting and fixing the light source bulb 212.

The holder 216 is a member formed to be extended in a cylindrical shape to direct to a front side from a position proximate to a front end edge of the first reflector 214 centering on the optical axis Ax and fixed to support an outer peripheral edge portion of the projection lens 218 at a front end portion thereof. Further, the holder 216 is fixed to be supported by the second reflector 224 at a rear end portion thereof.

The mirror member 228 is a member having an upward directed reflecting face 228*a* extended to a rear side from the rear focal point F of the projection lens 218 between the light source 212*a* and the projection lens 218 and is formed integrally with a holder 216.

The upward directed reflecting face 228*a* of the mirror member 228 is constituted by a horizontal face including the optical axis Ax at a left side region thereof disposed on a left side of the optical axis Ax, and a right side region thereof disposed on a right side of the optical axis Ax is constituted by a horizontal face one stage lower than the left side region by way of a short inclined face. Further, a front end edge of the upward directed reflecting face 228*a* is formed to extend substantially in a shape of a circular arc along a rear focal point face of the projection lens 218. Thereby, the mirror member 228 reflects a portion of reflected light from the first reflector 214 in an upward direction at the upward directed reflecting face 228*a* to be incident on the projection lens 218 to be emitted from the projection lens 218 as downward directed light.

The first reflector 214 is fixed to be supported by the second reflector 224 at the bracket 14*c* in a state of mounting a lower end face of a peripheral edge thereof by the upward directed reflecting face 228*a* of the mirror member 228.

The light shielding plate 234 is horizontally arranged on a lower side of the light source bulb 212 and a rear end edge 234*a* is extended in a vehicle width direction to pass the point D (that is, the second focal point of the ellipsoid of revolution constituting the reflecting face 224*a* of the second reflector 224). The light shielding plate 234 is integrally formed with the second reflector 224. In order to realize the constitution, the second reflector 224 is formed with a rectangular opening portion 224*d* constituting a front end edge thereof by the rear end edge 234*a* of the light shielding plate 234.

The third reflector 226 is arranged on a skewed lower side on a front side of the light shielding plate 234 and reflects light from the light source 212*a* reflected by the second reflector 226 to direct to the front side without transmitting through the projection lens 218. A reflecting face 226*a* of the third reflector 226 is constituted by a parabola column face constituting a focal line by a rear end edge 234*a* of the light shielding plate 234 and a shape of a vertical section orthogonal to the focal line is constituted by a parabola constituting an axis thereof by an axis line extended in parallel with the optical axis Ax and having a comparatively short focal length. The third reflector 226 is fixed to be supported by the second reflector 224 at a rear end portion thereof.

The fourth reflector 230 is arranged on a skewed lower side of a rear side of the light source 212*a* and includes a reflecting face 230*a* in a spherical shape centering on the center position A of the light source 212*a*. An outer peripheral edge of the reflecting face 230*a* is provided with a semicircular shape having a diameter slightly smaller than the effective diameter of the projection lens 218 and an upper end edge thereof is formed to be extended in a shape of a downward directed circular arc on a rear side of the optical axis Ax. Thereby, the fourth reflector 230 returns light directed from the light source 212*a* on a skewed lower side of a rear side thereof at the reflecting face 230*a* to be incident on the reflecting face 214*a* of the first reflector 214 as quasi diverging light. The fourth reflector 230 is integrally formed with the second reflector 224.

The fifth reflector 232 is arranged on a skewed lower side on a front side of the light source 212*a* and includes a reflecting face 232*a* in a spherical shape centering on the center position A of the light source 212*a*. An outer peripheral edge of the reflecting face 232*a* is provided with a semicircular shape having a diameter smaller than the effective diameter of the projection lens and an upper end edge thereof is disposed at a height slightly lower than the optical axis Ax. Thereby, the fifth reflector 232 returns light directed from the light source 212*a* to a skewed lower side of a front side thereof to the light source 212*a* at the reflecting face 232*a* to be incident on the reflecting face 224*a* of the second reflector 224 as quasi diverging light from the light source 12*a*. The fifth reflector 232 is positioned to be fixed by the second reflector 224 to be interposed by the mirror member 228 and a bottom face wall of the second reflector 224.

Figure 17:
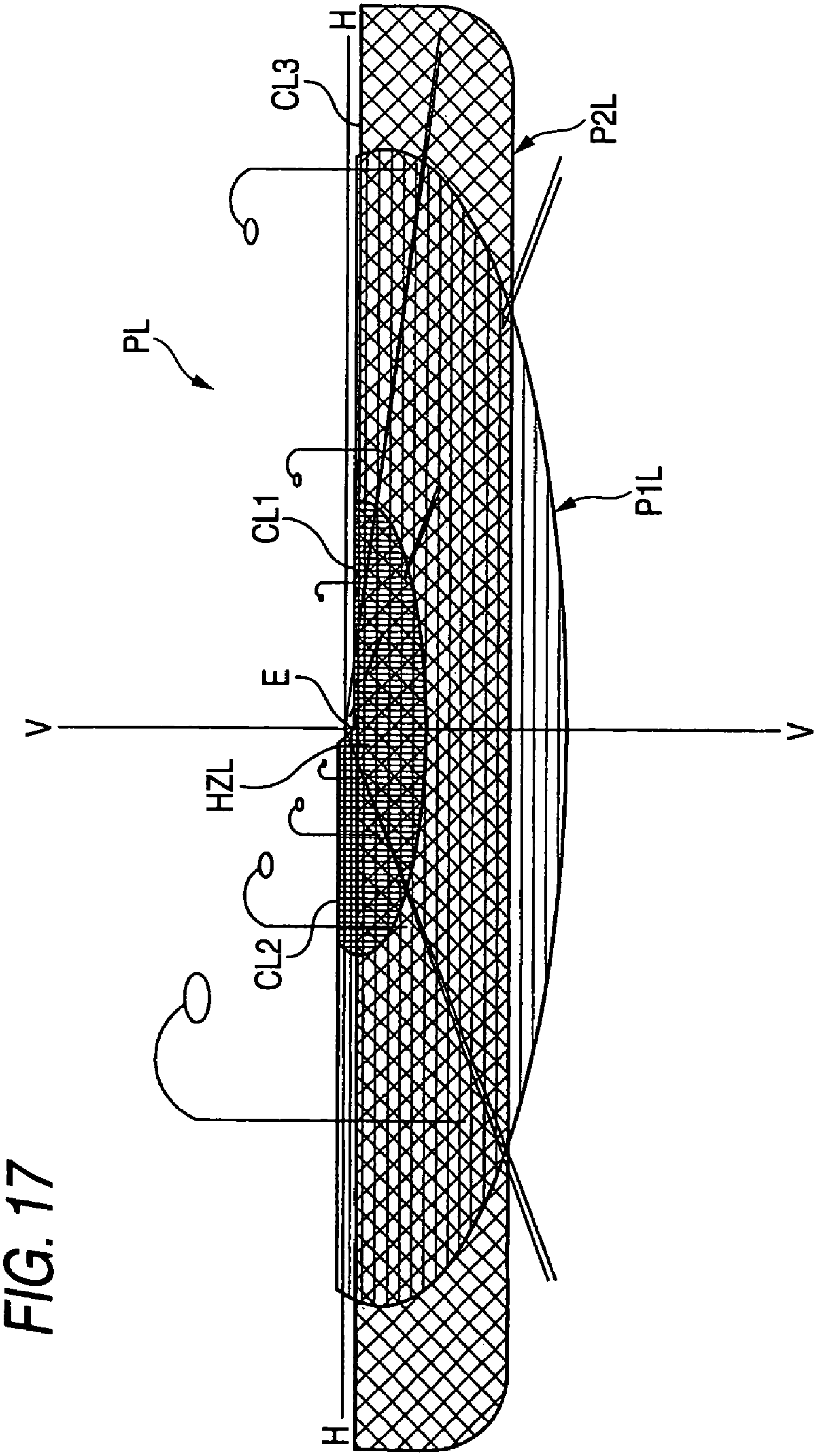
FIG. 17 is a diagram perspectively showing a light distribution pattern for a high beam formed on an imaginary vertical screen arranged at a position of 25 m frontward from a lamp piece by light irradiated to a front side from the vehicle headlamp.

FIG. 17 is a diagram perspectively showing a light distribution pattern for a low beam formed on an imaginary vertical screen arranged at a position 25 m frontward from the lamp piece by light irradiated to a front side from the vehicle headlamp 210.

As shown by the drawing, the light distribution pattern PL for a low beam is a light distribution pattern for a low beam of left light distribution and includes cut off lines CL1, CL2 having a stepped difference therebetween in a left and right direction at an upper end edge thereof. The cut off lines CL1, CL2 are extended in a horizontal direction with the stepped difference in the left and right direction by constituting a boundary by a line V-V passing H-V constituting a vanishing point in a front direction of the lamp piece in a vertical direction, an opposed lane side portion on a left side of the line V-V is formed as a lower stage cut off line CL1 and a driving lane side portion on a left side of the line V-V is formed as an upper stage cut off line CL2 stepped up from the lower stage cut off line CL1 by way of an inclined portion.

In the light distribution pattern PL for a low beam, an elbow point E constituting an intersection of a lower stage cut off line CL1 and the line V-V is disposed on a lower side of H-V by about 0.5 through 0.60°. This is because the optical axis Ax is extended in a lower direction relative to a longitudinal direction of the vehicle by about 0.5 through 0.6°. Further, in the light distribution pattern PL for a low beam, a hot zone HZL constituting a high light intensity region is formed to surround the elbow point E.

The light distribution pattern PL for a low beam is constituted as a synthesized light distribution pattern of two light distribution patterns P1L, P2L.

The light distribution pattern P1L is a light distribution pattern formed by light from the light source 212*a* reflected by the reflecting face 214*a* of the first reflector 214 and transmitted through the projection lens 218 and is formed as an inverted projected image of a light source image formed on a rear side focal point face (that is, focal point face including the rear focal point F) of the projection lens 218. Further, the cut off lines CL1, CL2 of the light distribution pattern PL for a low beam are formed at the light distribution pattern P1L as an inverted projected image of the front end edge of the upward directed reflecting face 228*a* of the mirror member 228.

The light distribution pattern P1L is formed as a transversely prolonged light distribution pattern considerably expanded in the left and right direction centering on the line V-V to ensure a diverging angle necessary as the light distribution pattern for a low beam. The light distribution pattern P1L is formed as the light distribution pattern considerably expanded in the left and right direction in this way because the light source 212*a* is constituted as the line segment light source extended in the vehicle width direction and the eccentricity of the ellipse constituting the sectional shape of the reflecting face 214*a* of the first reflector 214 is set to increase gradually from the vertical section to the horizontal section.

Further, the hot zone HZL of the light distribution pattern PL for a low beam is formed by the light distribution pattern P1L. The hot zone HZL is formed by the light distribution pattern P1L in this way because the second focal point of the ellipse E1V constituting the vertical section including the optical axis Ax of the reflecting face 214*a* of the first reflector 214 is disposed at the point B disposed slightly forward from the rear focal point F of the projection lens 218, thereby, light emitted from the projection lens 218 after having been reflected by the upward directed reflecting face 228*a* of the mirror member 228 is directed to a vicinity of the elbow point E.

Reflected light from the first reflector 214 contributing to forming the light distribution pattern P1L is constituted by light directly incident on the reflecting face 214*a* from the light source 212*a* and light incident on the reflecting face 14*a* of the first reflector 214 after having been reflected by the reflecting face 230*a* of the fourth reflector 230.

The light distribution pattern P2L is a light distribution pattern formed by light from the light source 212*a* reflected by the reflecting face 224*a* of the second reflector 224, thereafter, reflected by the reflecting face 226*a* of the third reflector 226 and irradiated to the front side without transmitting through the projection lens 218 and an upper end edge thereof includes a cut off line CL3 extended in a horizontal direction.

The light distribution pattern P2L is formed as a transversely prolonged light distribution pattern expanded by a left and right diverging angle larger than that of the light distribution pattern P1L centering on the line V-V to thereby intensify brightness on two left and right sides of the light distribution pattern P1L to further promote optical recognizability in turning to run. The light distribution pattern P2L is formed as the transversely prolonged light distribution pattern which is widely expanded in this way because the reflecting face 226*a* of the third reflector 226 is constituted by the parabola column face. At that occasion, the light distribution pattern P2L is constituted by a light distribution pattern having a narrow up and down width because the light source 212*a* is constituted as the line segment light source extended in the vehicle width direction.

The cut off line CL3 of the light distribution pattern P2L is formed as an inverted image of the rear end edge 234*a* by shielding a portion of reflected light directed to the third reflector 226 from the second reflector 224 by the light shielding plate 234. At that occasion, the cut off line CL3 is disposed at a height substantially the same as that of the lower stage cut off line CL1 because in the parabola column face constituting the reflecting face 224*a* of the second reflector 224, an axis of the parabola constituting the vertical section is extended in parallel with the optical axis Ax.

As has described above in details, the vehicle headlamp 210 according to the embodiment is constituted as the lamp piece unit of the projector type having the mirror member 228, the light source 212*a* is constituted as the line segment light source extended in the vehicle width direction and arranged at the position at which the distance L from the center position A to the rear focal point F of the projection lens 18 becomes the value smaller than the focal length f of the projection lens 218, further, the region of the rear portion of the first reflector 214 proximate to the optical axis is formed as the opening portion 214*b*, the second reflector 224 having the reflecting face 224*a* in the shape of the ellipsoid of revolution constituting the first focal point by the center position A of the light source 212*a* and constituting the second focal point by the point D disposed on the lower side of the first focal point is provided on the rear side, further, the lower side of the second reflector 224 is provided with the third reflector 226 for reflecting light from the light source 212*a* reflected by the second reflector 224 to the front side without transmitting through the projection lens 218 and therefore, the following operation and effect can be achieved.

That is, a portion of reflected light from the first reflector 214 is reflected to the upper side by the mirror member 228 including the upward directed reflecting face 228*a* extended to the rear side from the rear focal point F of the projection lens 218 and therefore, the light distribution pattern PL for a low beam having the clear cut off lines CL1, CL2 as inverted projected image of the front end edge of the upward directed reflecting face 228*a* can be formed and reflected light from the first reflector 214 can effectively be utilized as front irradiating light.

At that occasion, the light source 212*a* is constituted as the line segment light source extended in the vehicle width direction and therefore, the inverted projected image of the light source 212*a* formed by the projection lens 218 can be made to constitute the image substantially in the transversely prolonged rectangular shape extended to be long in the horizontal direction, thereby, the light distribution pattern PL for a low beam can easily be formed as the transversely prolonged light distribution pattern having a small nonuniformity in light distribution.

Further, the distance L from the center position A of the light source 212*a* to the rear focal point F is set to the value smaller than the focal length f of the projection lens 218 and therefore, a solid angle of the reflecting face 214*a* relative to the light source 212*a* can be increased by downsizing the first reflector 214, thereby, much of light emitted from the light source 212*a* can be made to be incident on the reflecting face 214*a* of the first reflector 214.

However, although when the first reflector 214 is downsized in this way, the inverted projected image of the light source 212*a* formed by the projection lens 218 is enlarged, the light source 212*a* is the line segment light source extended in the vehicle width direction and the inverted projected image is enlarged while making the image stay substantially in the transversely prolonged rectangular shape and therefore, the transversely prolonged light distribution pattern can be maintained.

Further, although when the first reflector 214 is downsized in this way, the rear portion is liable to interfere with the light source 212, the region of the rear portion of the first reflector 214 proximate to the optical axis is formed as the opening portion 214*b* and therefore, such an interference can be prevented from being brought about beforehand. Further, the second reflector 224 having the reflecting face 224*a* in the shape of the ellipsoid of revolution constituting the first focal point by the center position A of the light source 212*a* and constituting the second focal point by the point D disposed on the lower side of the first focal point is provided on the rear side of the first reflector 214, further, the lower side of the second reflector 224 is provided with the third reflector 226 for reflecting light from the light source 212*a* reflected by the second reflector 224 to the front side without transmitting through the projection lens 218 and therefore, light directed to the rear side from the light source 212*a* by way of the opening portion 214*b* can be made to be incident on the third reflector 226 as diverging light from the second focal point after being reflected by the second reflector 224 and the light can effectively be utilized front irradiating light.

In this way, according to the embodiment, in the vehicle headlamp 210 of the projector type having the mirror member 228, thin formation of the lamp piece is achieved, the transversely prolonged light distribution pattern having a small nonuniformity in light distribution can be formed and an efficiency of utilizing the light flux of the light source can be increased.

Further, according to the embodiment, the light source 212*a* is constituted by a light emitting portion of the light source bulb 212 inserted to be fixed to the second reflector 224 from a side direction of the optical axis Ax and therefore, thin formation of the lamp piece can easily be realized. Further, when constituted in this way, the light source bulb having the line segment light source extended in the bulb center axis Ax1 can be used as in the light source bulb 212 and therefore, a width of selecting a kind of the light source bulb can be widened.

Further, according to the embodiment, the light shielding plate 234 having the rear end edge 234*a* extended in the vehicle width direction to pass the second focal point is provided between the second reflector 224 and the third reflector 226 to pass the second focal point and therefore, a portion of reflected light from the second reflector 224 can be shielded by the shielding plate 234, thereby, also the light distribution pattern P2L formed by reflected light from the third reflector 226 can be provided with the clear cut off line CL3 at the upper end portion.

At that occasion, the third reflector 226 includes the reflecting face 226*a* in the shape of the parabola column face constituting the focal line by the rear end edge 234*a* of the light shielding plate 234 and therefore, the light distribution pattern P2L formed by reflected light from the third reflector 226 can be made to constitute the transversely prolonged light distribution pattern considerably expanded in the left and right direction.

Further, according to the embodiment, a skewed lower side on the rear side of the light source 212*a* is provided with the fourth reflector 230 including the reflecting face 230*a* in the spherical shape centering on the center position of the light source 212*a* and therefore, light directed to the skewed lower side on the rear side from the light source 212*a* can be reflected by the fourth reflector 230 to return a vicinity of the light source 212*a*, the light can be made to be incident on the first reflector 214 as diverging light from the vicinity of the light source 212*a*, thereby, the efficiency of utilizing the light flux of the light source can further be increased.

Further, according to the embodiment, the skewed lower side on the front side of the light source 212*a* is provided with the fifth reflector 232 including the reflecting face 232*a* in the spherical shape centering on the center position of the light source 212*a* and therefore, light directed to the skewed lower side on the front side from the light source 212*a* can be reflected by the fifth reflector 232 to return to the vicinity of the light source 212*a*, the light can be made to be incident on the second reflector 224 as diverging light from the vicinity of the light source 212*a*, thereby, the efficiency of utilizing the light flux of the light source can further be increased.

Although according to the embodiment, an explanation has been given such that the second focal point of the ellipsoid of revolution constituting the reflecting face 224*a* of the second reflector 224 is disposed at the point D disposed right below the first focal point, the second focal point can also be set to a position deviated from the point D in a longitudinal direction or in a left and right direction.

Further, although in the embodiment, an explanation has been given such that the reflecting face 226*a* of the third reflector 226 is constituted by the parabola column face constituting the focal line by the rear end edge 234*a* of the light shielding plate 234, the reflecting face 226*a* can also be constituted by other curved face (for example, paraboloid of revolution, free curved face or the like).

Further, instead of returning light from the light source 212*a* to a vicinity of the light source 212*a* by the fourth and the fifth reflector 230, 232 as in the embodiment, there can be constructed a constitution in which a reflecting film is formed at the shroud tube 212 of the light source bulb 212 of the light source bulb 212 and light of the light source 212*a* is returned to the vicinity of the light source 212*a* by the reflecting film.

Figure 18:
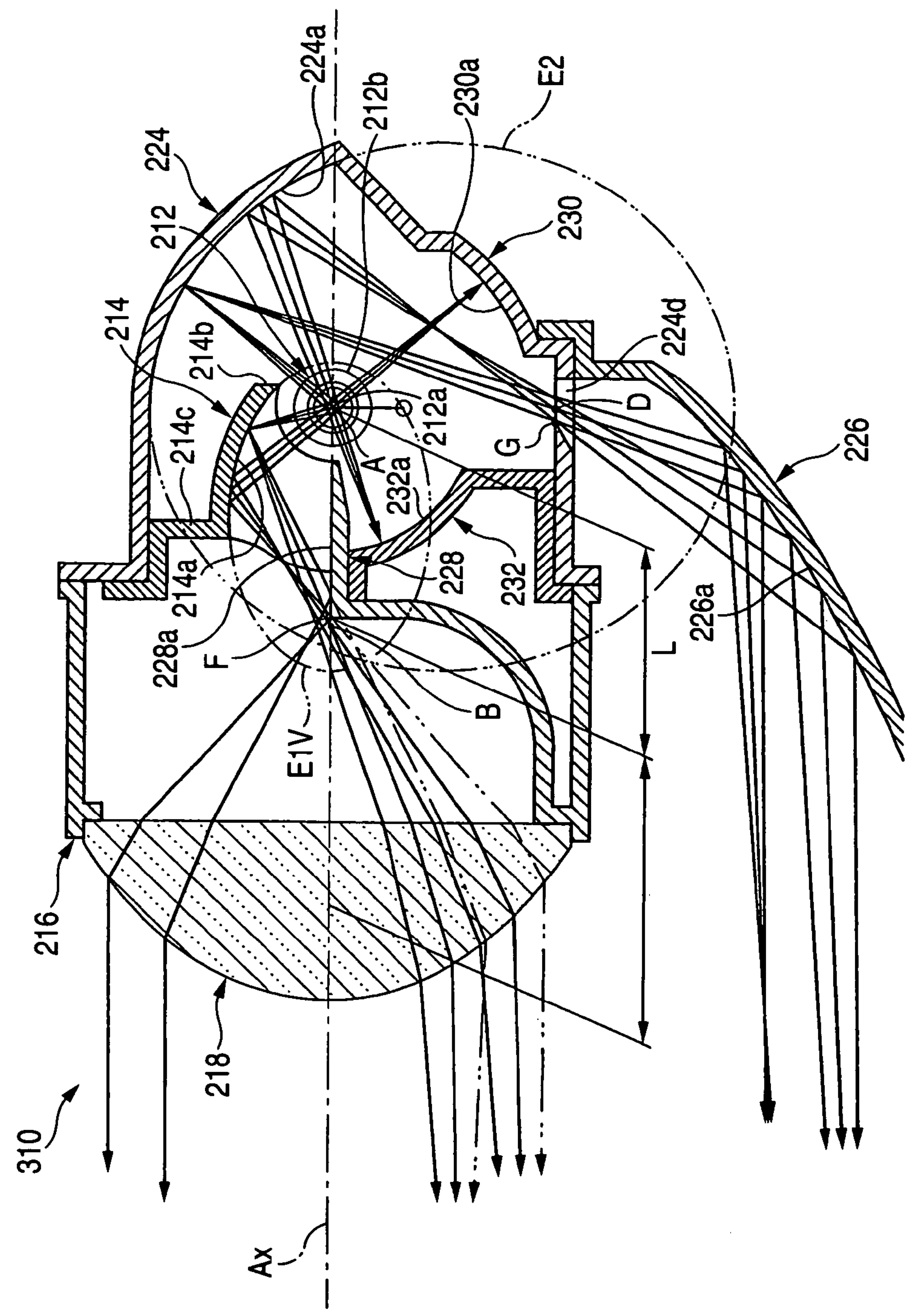
FIG. 18 is a side sectional view of a vehicle headlamp according to a fourth exemplary embodiment.

FIG. 18 is a view showing a vehicle headlamp according to a fourth exemplary embodiment.

As shown by the drawing, although a basic constitution of a vehicle headlamp 310 according to the fourth exemplary embodiment is similar to that in the case of the third exemplary embodiment, the shape of the rectangular opening portion 224*d* of the second reflector 224 and the arrangement of the third reflector differ from those of the third exemplary embodiment.

That is, according to the fourth exemplary embodiment, the front end edge of the rectangular opening portion 214*d* of the second reflector 224 is disposed slightly on the front side of the point D, thereby, all of light from the light source 212*a* reflected by the second reflector 224 is made to be incident on the third reflector 226.

Further, although the third reflector 226 of the fourth exemplary embodiment is similar to that in the case of the third exemplary embodiment in that the reflecting face 226*a* is constituted by the parabola column face, the focal line is extended in the vehicle width direction to pass a point G disposed slightly on the front side of the point D. Further, thereby, all of light from the second reflector 224 incident on the third reflector 226 is reflected to direct to the front side as light directed downward.

Figure 19:
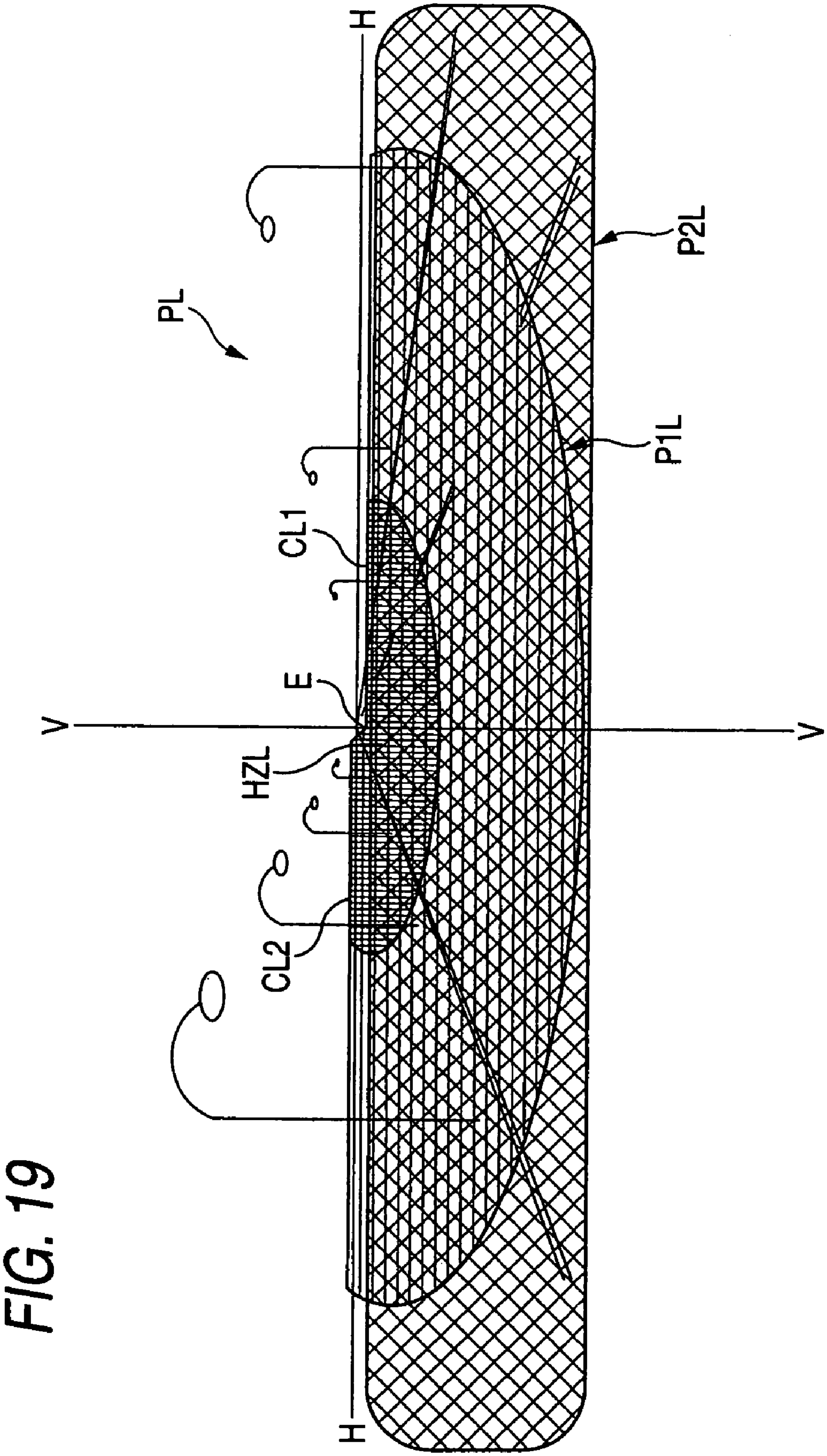
FIG. 19 is a diagram perspectively showing a light distribution pattern for a high beam formed on an imaginary vertical screen arranged at a position of 25 m frontward from a lamp piece by light irradiated to a front side from the vehicle headlamp, according to the fourth exemplary embodiment.

When the constitution of the fourth exemplary embodiment is adopted, as shown by FIG. 19, although a light distribution pattern P2L' formed by reflected light from the third reflector 226 does not include the clear cut off line CL3 at an upper end portion thereof as in the light distribution pattern P2L of the third exemplary embodiment, the light distribution pattern P2L' can constitute a light distribution pattern expanded to a side lower than that of the light distribution pattern P2L of the third exemplary embodiment, thereby, also a near distance region of a vehicle front road face can be irradiated efficiently brightly.

Figure 20:
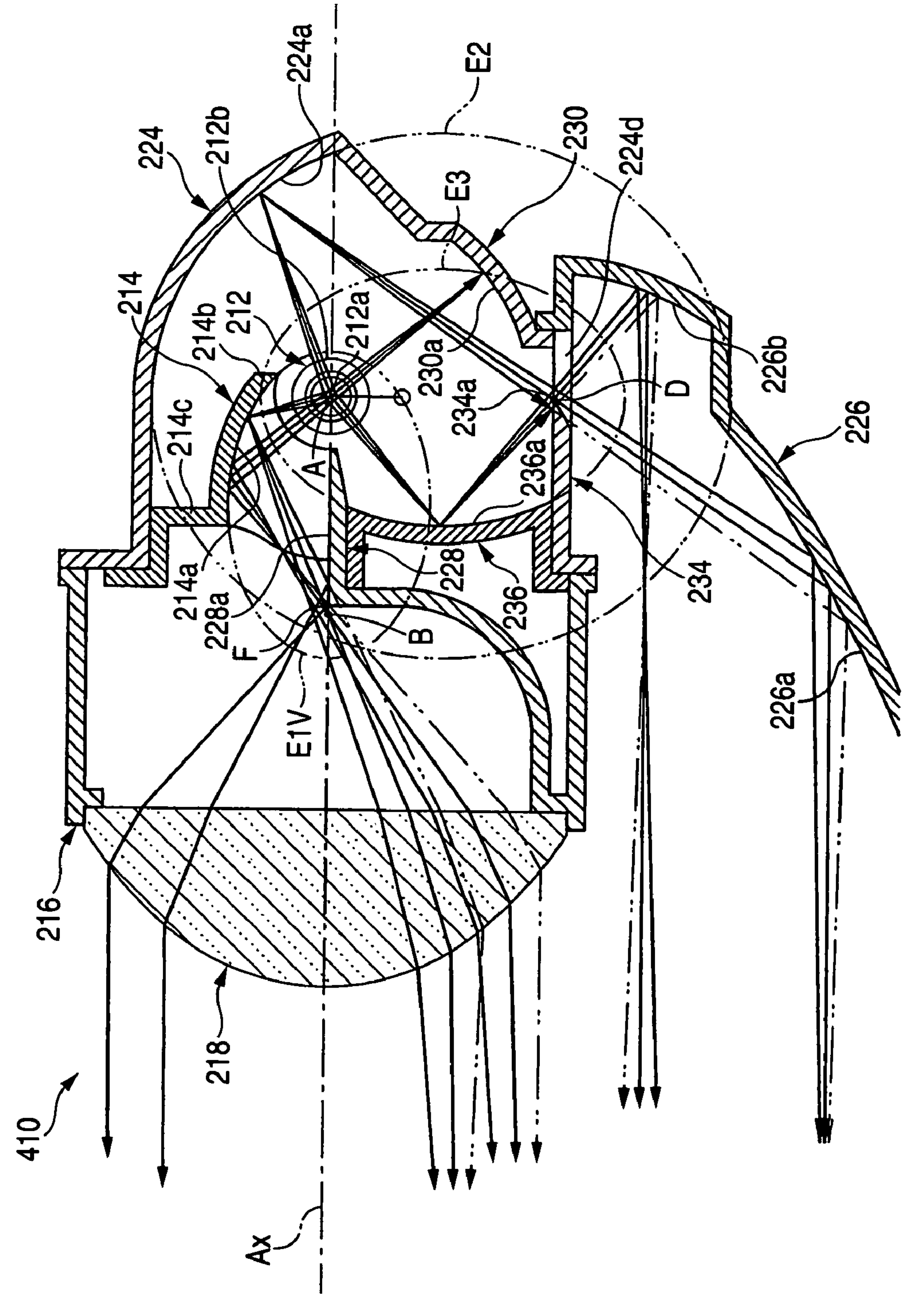
FIG. 20 is a side sectional view of a vehicle headlamp according to a fifth exemplary embodiment.

FIG. 20 is a view showing a vehicle headlamp according to a fifth exemplary embodiment.

As shown by the drawing, a vehicle headlamp 410 according to the fifth exemplary embodiment is provided with a sixth reflector 236 in place of the fifth reflector 232 of the third exemplary embodiment, further, a shape of a reflecting face of the third reflector 226 partially differs from that in the case of the third exemplary embodiment.

The sixth reflector 236 is arranged on a skewed lower side on the front side of the light source 212*a*, a reflecting face 236*a* thereof is formed in a shape of an ellipsoid of revolution constituting a center axis thereof by a vertical axis line orthogonal to the optical axis Ax. At that occasion, an ellipsoid E3 including the center axis of the ellipsoid of revolution constituting the reflecting face 236*a* constitutes a first focal point by the center position A of the light source 212*a* and constitutes a second focal point by the point D (that is, second focal point of the ellipsoid of revolution constituting the reflecting face 224*a* of the second reflector 224).

Further, the sixth reflector 236 reflects light directed to a skewed lower side on the front side from the light source 212*a* to direct to a skewed lower side on a rear side to be incident on the third reflector 226 as diverging light from the point D.

Further, an upper region of a reflecting face 226*a* of the third reflector 226 according to the fifth exemplary embodiment is constituted as a reflecting face 226*b*, thereby, reflected light from the second reflector 224 is made to be incident on the reflecting face 226*a* and reflected light from the sixth reflector 236 is made to be incident on the reflecting face 226*b*.

At that occasion, although the reflecting face 226*b* of the third reflector 226 is constituted by a parabola column face constituting a focal line by the rear end edge 234*a* of the light shielding plate 234 similar to the reflecting face 226*a*, a focal length of a parabola constituting the vertical section is set to a value larger than that in the case of the reflecting face 226*a*. Further, thereby, much of reflected light from the sixth reflector 236 is effectively utilized as front irradiating light by avoiding reflected light from the reflecting face 226*b* from being shielded by the holder 216 or the like as less as possible.

At that occasion, also with regard to reflected light from the sixth reflector 236, a portion there of is shielded by the light shielding plate 234 to thereby contribute to forming the cut off line CL3 of the light distribution pattern P2L.

Also in the case of adopting the constitution of the fifth exemplary embodiment, the efficiency of utilizing the light flux of the light source can sufficiently be increased.

Further, although in the respective exemplary embodiments, an explanation has been given such that the light source bulbs 12, 112, 212 are inserted to be fixed from the right side direction, a constitution of inserting to fix the light source bulb from the left side direction may be constructed, in accordance with one or more embodiments of the present invention.

Further, although according to the respective exemplary embodiments, an explanation has been given such that the projection lenses 18, 118, 218 are constituted by the flat convex aspherical lenses, the projection lens can also be constituted by a normal convex lens or Fresnel lens or the like, in accordance with one or more embodiments of the present invention.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens arranged on an optical axis extended in a longitudinal direction of a vehicle;

a light source arranged on a rear side of a rear focal point of the projection lens, wherein the light source is constituted as a line segment light source extended in a vehicle width direction and a distance from a center position of the light source to the rear focal point of the projection lens is smaller than a focal length of the projection lens;

a first reflector that reflects light from the light source to direct in a front direction to be proximate to the optical axis;

an opening portion formed on a region of a rear portion of the first reflector proximate to the optical axis; and a second reflector provided on a rear side of the first reflector, wherein the light directed to a rear side from the light source is reflected on the second reflector to a front side to be proximate to the optical axis.

2. The vehicle headlamp according to claim 1, wherein the light source is constituted by a light emitting portion of a light source bulb inserted from a side direction of the optical axis.

3. The vehicle headlamp according to claim 1, further comprising:

a third reflector provided on a surrounding of the second reflector, wherein the light from the light source is reflected on the third reflector to the front side without transmitting through the projection lens.

4. The vehicle headlamp according to claim 1, further comprising:

a mirror member including an upward directed reflecting face extended from a vicinity of the rear focal point to a rear side and provided between the light source and the projection lens, wherein portions of reflected light from the first and the second reflectors are reflected to an upper side on the mirror member.

5. The vehicle headlamp according to claim 4, further comprising:

a fourth reflector provided in a lower and rear side of the light source and having a reflecting face substantially in a spherical shape centering on the center position of the light source.

6. The vehicle headlamp according to claim 4, further comprising:

a fifth reflector provided in a lower and front side of the light source and having a reflecting face substantially in a spherical shape centering on the center position of the light source.

7. A vehicle headlamp comprising:

a projection lens arranged on an optical axis extended in a longitudinal direction of a vehicle;

a light source arranged on a rear side of a focal point of the projection lens, wherein the light source is constituted as a line segment light source extended in a vehicle width direction and a distance from a center position of the light source to the rear focal point of the projection lens is smaller than a focal length of the projection lens;

a first reflector that reflects light from the light source to direct in a front direction to be proximate to the optical axis;

an opening portion formed on a region of a rear portion of the first reflector proximate to the optical axis;

a mirror member having an upward directed reflecting face extended to a rear side from a vicinity of the rear focal point, wherein a portion of reflected light from the first reflector is reflected to an upper side;

a second reflector provided in a rear side of the first reflector and including a reflecting face substantially in a shape of an ellipsoid of revolution, wherein the ellipsoid of revolution has a first focal point by the center position of the light source and a second focal point by a point disposed on a lower side of the first focal point; and a third reflector provided in a lower side of the second reflector, wherein the light reflected on the second reflector is reflected on the third reflector to the front side without transmitting through the projection lens.

8. The vehicle headlamp according to claim 7, wherein the light source is constituted by a light emitting portion of a light source bulb inserted from a side direction of the optical axis.

9. The vehicle headlamp according to claim 7, further comprising:

a fourth reflector provided in a lower and rear side of the light source and having a reflecting face substantially in a spherical shape centering on the center position of the light source.

10. The vehicle headlamp according to claim 7, further comprising:

a fifth reflector provided in a lower and front side of the light source and having a reflecting face substantially in a spherical shape centering on the center position of the light source.

11. The vehicle headlamp according to claim 7, further comprising:

a sixth reflector provided in a lower and front side of the light source and having a reflecting face substantially in a shape of an ellipsoid of revolution constituting a first focal point by the center position of the light source and constituting a second focal point by the second focal point of the second reflector.

12. The vehicle headlamp according to claim 7, further comprising:

a light shielding plate, having a rear end edge extended in the vehicle width direction to pass the second focal point of the second reflector, provided between the second reflector and the third reflector.

13. The vehicle headlamp according to claim 12, wherein the third reflector includes a reflecting face in a shape of a parabola column face constituting a focal line by the rear end edge of the light shielding plate.

* * * * *